United States Patent [19]

Rounds

[11] Patent Number: 4,974,118
[45] Date of Patent: Nov. 27, 1990

[54] NONISOTROPIC SOLUTION POLARIZABLE MATERIAL AND ELECTRICAL COMPONENTS PRODUCED THEREFROM

[75] Inventor: Rhyta S. Rounds, Flemington, N.J.

[73] Assignee: Colgate-Palmolive Company, Piscataway, N.J.

[21] Appl. No.: 396,482

[22] Filed: Aug. 21, 1989

Related U.S. Application Data

[63] Continuation-in-part of Ser. No. 17,424, Feb. 20, 1987, Pat. No. 4,878,150.

[51] Int. Cl.$^5$ ............................................. H01G 4/06
[52] U.S. Cl. .................................. 361/311; 252/62.2
[58] Field of Search .............................. 361/311–315, 361/323, 321; 252/62.2

[56] References Cited

U.S. PATENT DOCUMENTS

| | | | |
|---|---|---|---|
| 1,576,096 | 3/1926 | Davey | 361/315 X |
| 1,804,364 | 5/1981 | Parker | 361/316 X |
| 1,886,235 | 1/1932 | Meissner | 307/400 X |
| 1,952,158 | 3/1934 | Clark et al. | 361/504 X |
| 1,952,158 | 3/1934 | Clark et al. | 175/361 |
| 1,997,263 | 4/1935 | Meissner | 204/31 |
| 2,024,705 | 12/1935 | Rutherford | 179/106 |
| 2,190,592 | 2/1940 | Clayton | 87/16 |
| 2,284,039 | 5/1942 | Bruno | 179/111 |
| 2,336,893 | 12/1943 | Scott | 260/418 |
| 2,460,109 | 1/1949 | Southworth | 179/171.5 |
| 2,916,792 | 12/1959 | Crook et al. | 25/8 |
| 2,986,524 | 1/1949 | Padgett | 252/63.2 |
| 2,995,688 | 8/1961 | Rosenberg | 361/323 |
| 3,296,829 | 1/1967 | Williams | 64/15 |
| 3,301,786 | 1/1967 | Klass | 361/311 X |
| 3,458,713 | 7/1969 | Perlman et al. | 307/88 |
| 3,652,902 | 3/1972 | Hart et al. | 361/502 |
| 3,700,975 | 10/1972 | Butherus et al. | 361/502 |
| 3,793,215 | 2/1974 | Smith | 252/117 |
| 3,926,829 | 12/1975 | Smith et al. | 252/132 |
| 3,951,879 | 4/1976 | Wixon | 252/547 |
| 4,017,660 | 4/1977 | Barraud et al. | 361/323 X |
| 4,201,743 | 5/1980 | Perla et al. | 264/148 |
| 4,285,826 | 8/1981 | Bertozzi et al. | 252/117 |
| 4,474,683 | 10/1984 | Story et al. | 252/369 |
| 4,490,280 | 12/1980 | Joshi et al. | 252/368 |
| 4,493,786 | 1/1985 | Joshi | 252/368 |
| 4,622,611 | 11/1986 | Bennett et al. | 361/502 |
| 4,626,959 | 12/1986 | Shedigan et al. | 361/315 |
| 4,630,175 | 12/1986 | Cuellar et al. | 361/502 |
| 4,633,372 | 12/1986 | Calahan et al. | 361/502 |
| 4,638,407 | 1/1986 | Lundsgaard | 361/313 X |

FOREIGN PATENT DOCUMENTS

| | | | |
|---|---|---|---|
| 16658 | 2/1979 | Japan | 361/323 |
| 1166933 | 7/1985 | U.S.S.R. | 252/62.2 |

OTHER PUBLICATIONS

Japanese publication 49,105 (Matsushita Electric) published Mar. 21, 1984.
"Persistency of Surface Charge of Thermal Electrets of Carnauba Wax, Esters Fatty Acids and Alcohols", Takanatsu, et al., Rep. Inst. Phys. and Chem. Res. (Japan) vol. 53, No. 3, pp. 49–61 (1977).
"Electron Tunneling Through Fatty-Acid Monolayers", E. Polymeropoulos, Appl. Phys. (U.S.) vol. 48, No. 5, pp. 2404–2407 (Jun. 1977).
"Dielectric Studies of Temperature Transitions in Soap-Hydrocarbon Systems", Deinega et al., Kolloidn, Zh., vol. 45, No. 3, pp. 553–557 (1983).
"Study of Dielectric Relaxation and Dipole Moments of Chromium (II) Salts of Some Fatty Acids", Pardeshi, L., Acta Cieno, Indica (Ser.) Chem., vol. 8, 1982.
"Japanese publication 16,658 (Nisshin Electrical)", published Feb. 2, 1979.
A. J. Juodikis–"Supercapacitors Serve as Standby Power Source"–Sep. 30, 1982, Electronic Design.
Sanada and Hosokaroa–"Electric Double Capacitor 'Super Capacitor'"–Oct. 1979–NEC Research and Development.
Inada–"Super Capacitor Works as a Power Backup for Microcomputers"–Nov. 1982, Journal of Electronic Equipment.

*Primary Examiner*—Donald A. Griffin
*Attorney, Agent, or Firm*—Bernard Lieberman; Murray M. Grill; Robert C. Sullivan

[57] ABSTRACT

A polarizable material that includes a nonisotropic solution useful for making electrical devices. In one embodiment, the polarizable material is comprised of commercially available solid bar soap, neat soap or a polymorphic solid solution and employed as the dielectric in a capacitor or an electrolyte in a supercapacitor. In another embodiment the nonisotropic solution is employed as an electrolyte in an electrochemical battery.

14 Claims, 20 Drawing Sheets

Fig. 23.

| Fatty Acid | Carbon Atoms | Double Bonds | Vegetable | | | | | | | | | | | | | | Animal | | | | Marine | | | |
|---|---|---|---|---|---|---|---|---|---|---|---|---|---|---|---|---|---|---|---|---|---|---|---|---|
| | | | Babassu | Castor | Coconut | Corn | Cottonseed | Linseed | Olive | Palm | Palm Kernel | Peanut | Rapeseed | Sesame | Soybean | Tuna | Lard | Mutton | Neats Foot | Beef Tallow | Herring | Menhaden | California Sardine | Whale |
| Caproic | 6 | 0 | 0.2 | | 0.5 | | | | | | 0.5 | | | | | | | | | | | | | |
| Caprylic | 8 | 0 | 6.5 | | 8.0 | | | | | | 3.0 | | | | | | | | | | | | | |
| Capric | 10 | 0 | 9.0 | | 7.0 | | | | | | 6.0 | | | | | | | | | | | | | |
| Lauric | 12 | 0 | 46.5 | | 48.0 | | | | | | 50.0 | | | | | | | | | | | | | |
| Myristic | 14 | 0 | 20 | | 18.5 | | 0.5 | | | | 15.0 | | 0.5 | | | | | | | | | | | |
| Myristoleic | 14 | 1 | | | | | | | | | | | | | | | | | | | | | | |
| Palmitic | 16 | 0 | 7.0 | 1.0 | 9.0 | 8.0 | 21.0 | 5.0 | 0.7 | 42.0 | 7.5 | 7.0 | 1.5 | 8.0 | 0.1 | 4.0 | 1.0 | 2.0 | | 3.0 | 7.0 | 7.0 | 5.0 | 8.0 |
| Palmitoleic | 16 | 1 | | | | 3.5 | | | | | | | | | | 1.0 | 0.5 | | | 0.4 | 0.6 | 0.1 | | 2.0 |
| Stearic | 18 | 0 | 15.0 | 1.0 | 3.0 | 4.0 | 2.0 | 4.0 | 2.0 | 4.5 | 2.0 | 5.0 | 1.0 | 4.5 | 4.0 | 9.0 | 26.0 | 24.0 | 17.0 | 19.0 | 14.0 | 15.0 | 15.0 | 15.0 |
| Oleic | 18 | 1 | | 3.0 | 5.0 | 46.0 | 32.0 | 20.0 | 83.6 | 43.5 | 15.0 | 59.0 | 20.0 | 47.0 | 29.0 | 9.0 | 43.0 | 30.0 | 74.0 | 41.0 | 14.0 | 16.0 | 12.0 | 13.0 |
| Nicinoleic | 18 | 1 | | 87.0 | | | | | | | | | | | | | | | | | | | | |
| Linoleic | 18 | 2 | | 9.0 | 2.0 | 41.8 | 44.0 | 25.0 | 6.0 | 9.0 | 1.0 | 23.0 | 20.0 | 40.0 | 54.0 | 3.5 | 7.0 | 4.0 | 4.0 | 21.0 | 5.0 | 2.0 | 3.0 | 3.0 |
| Linolenic | 18 | 3 | | | | | | 45.5 | | | | | 2.0 | | 5.0 | 1.5 | 0.5 | | | 45.0 | 0.5 | 1.0 | 1.0 | 1.5 |
| Eleosteric | 18 | 3 | | | | | | | | | | | | | | | | | | | | | | |
| Arachidic | 20 | 0 | | | | 0.5 | 0.5 | 0.3 | 0.1 | | | 3.0 | 0.5 | 0.5 | 0.7 | 80.0 | | | | | | | | |
| Cadoleic | 20 | 1 | 1.9 | | | | | | | | | | | | | | | | | 0.5 | | | | |
| Arachodonic | 20 | 3-5 | | | | | | | | | | | 1.0 | | | | 2.0 | | | | 15.0 | | 10.0 | 16.0 |
| Behenic | 22 | 0 | | | | | | | | | | 1.0 | 1.0 | | | | | | | | 13.0 | 17.0 | 8.0 | |
| Erucic | 22 | 1 | | | | | | | | | | | 51.5 | | | | | | | | | | | |
| Clupengoohic | 22 | 3-5 | | | | | | | | | | 2.0 | 2.0 | | | | | | | 0.1 | 8.0 | 11.0 | 14.0 | 9.0 |
| Lignoceric | 24 | 0 | | | | 0.2 | | 0.2 | | | | | | | | | | | | | | | 15.5 | |

TYPICAL CHARACTERISTICS

| | Babassu | Castor | Coconut | Corn | Cottonseed | Linseed | Olive | Palm | Palm Kernel | Peanut | Rapeseed | Sesame | Soybean | Tuna | Lard | Mutton | Neats Foot | Beef Tallow | Herring | Menhaden | California Sardine | Whale |
|---|---|---|---|---|---|---|---|---|---|---|---|---|---|---|---|---|---|---|---|---|---|---|
| Iodine Value | 12-18 | 81-90 | 8-10 | 115-130 | 105-115 | 170-200 | 79-88 | 44-54 | 14-23 | 85-95 | 97-105 | 103-115 | 125-140 | 140-155 | 50-70 | 35-45 | 65-75 | 30-48 | 120-145 | 150-165 | 110-140 | 105-135 |
| Saponification Value | 191-53 | 177-187 | 251-263 | 187-193 | 194-196 | 189-195 | 185-196 | 196-205 | 245-255 | 185-194 | 170-180 | 187-194 | 189-194 | 188-195 | 195-196 | 192-197 | 192-197 | 192-200 | 188-195 | 188-192 | 188-194 | 185-195 |
| Titer - °C | 20-25 | 8 | 20-23 | 15-19 | 31-35 | 19-21 | 17-24 | 40-47 | 20-25 | 25-32 | 11-15 | 20-24 | 20-23 | 24-35 | 34-42 | 40-45 | 20-30 | 41-45 | 13-17 | 31-33 | 28-32 | 22-29 |

NONISOTROPIC SOLUTION POLARIZABLE MATERIAL AND ELECTRICAL COMPONENTS PRODUCED THEREFROM

RELATED APPLICATIONS

This is a continuation-in-part of U.S. application Ser. No. 017,424 filed Feb. 20, 1987 and now U.S. Pat. No. 4,878,150 issued Oct. 31, 1989.

BACKGROUND OF THE INVENTION

1. Field of the Invention

This invention relates generally to a polarizable material including nonisotropic solution useful in electrical devices and comprised of one or more amphiphatic compounds. The solution may have a liquid crystal microstructure, or may be a polymorphic solid micellar solution. More specifically, this invention relates to a nonisotropic solution having an ordered structure which makes it useful in the manufacture of electrical devices such as batteries, capacitors, supercapacitors, piezoelectric transducers, memory elements, insulators, semiconductors, rectifiers, detectors, thermosensitive devices, electrostatic copying devices and in devices that generate and reflect electromagnetic waves. An embodiment of this invention is a parallel plate supercapacitor or an electrochemical primary battery that can be charged and discharged comprised of a nonisotropic solution such as a neat solid or solid bar phase soap dielectric disposed between conducting electrodes.

2. Background of the Invention

Various electrical properties of organic materials such as waxes and resins have been disclosed in the prior art. In U.S. Pat. No. 1,952,158 issued to Clark et al. a colloidal gel is disclosed which remains plastic and stable at temperatures as low as −20° C. and as high as 110° C. and which comprises mineral oil and a small proportion of metallic soap as a dielectric material. Clark et al. disclose that when 2 to 12% wt. of metallic soap is added to approximately 90% wt. of mineral oil, a colloidal gel is formed which functions as a dielectric.

U.S. Pat. No. 1,576,096, issued to Davey disclosed the use of purified glycerides, essentially water free unsaturated fatty acids or the various soaps of the fatty acids in conjunction with a cellulose paper, as the dielectric material in capacitors. Davey attributes enhancement of the dielectric behavior of the cellulose paper to the addition of the purified glycerides. The essentially water-free unsaturated fatty acids or the various soaps of the fatty acids disclosed by Davy are believed to entrap residual water molecules on the surface of the cellulose paper so that the water does not contribute to the conductivity of the paper.

Methods for producing electrets from molten wax and wax-like materials solidified in an electric field are well known in the art. See U.S. Pats. Nos. 1,804,364; 1,886,235; 2,024,705; 2,986,524; 2,284,039 and 2,460,109. Electrets are quasi-permanent charged dielectric materials useful as tranducers in microphones, earphones, phonograph cartridges and the like.

U.S. Pat. No. 3,301,786, issued to Klass discloses a synthetic ferroelectric article comprised of a dispersion of a solid silica compound in an organic vehicle such as a polyoxyalkylene, paraffin wax, microcrystalline wax or polypropylene. Klass induces permanent electret properties on the opposite sides of his dispersion by subjecting a melted slab thereof to D.C. current during cooling.

U.S. Pat. No. 3,458,713, issued to Pearlman et al., discloses an electret comprised of a high molecular weight polycyclic bisphenol polycarbonate which has been permanently electrostatically polarized. Pearlman et al. disclose that such compounds retain electric charge for long periods of time, e.g., ten years.

U.S. Pat. No. 2,916,792, issued to Crook, et al. discloses an apparatus and method for controlling the rate of extrusion of soap bars by passing the soap bars which have a dielectric constant higher than air between the electrodes of a detecting capacitor and measuring changes in the capacitance thereof.

The electronic industry is striving to develop electrical devices which perform very complex functions but occupy a very small space. Recently, a new line of devices have been developed which have found a wide range of applications for which a relatively low voltage power source is required for extended time periods. These devices are known as electric double-layer capacitors, or supercapacitors, and are described in detail in the following articles:

A. J. Juodikis "Supercapacitors Serve As Standby Power Sources", Electronic Design, Sept. 30, 1982, pp 159-164;

K. Sanada and M. Hosokawa, "Electric Double Layer Capacitor 'Super Capacitor'", NEC Research & Development No. 55 (October, 1979) pp. 21-27; and K. Inada, "Super Capacitor Works As A Power Backup For Microcomponents", Journal of Electronic Engineering, November 1982, pp. 32-37.

These references disclose a double-layer capacitor comprising two phases in contact, one phase including, for example, activated carbon, and the second phase including for example a sulfuric acid solution, or a liquid organic electrolyte.

It can be seen from the foregoing prior art references that there is an ongoing effort to fill the need for materials having desirable electrical properties particularly, high dielectric constants and good capacitance and that can be easily and economically produced.

SUMMARY AND OBJECTS OF THE INVENTION

It is an object of the present invention to provide a polarizable material comprising a nonisotropic solution comprised of an amphiphatic compound and a liquid.

It is a further object of the present invention to provide a nonisotropic solution that exhibits desirable dielectric properties particularly, high capacitance.

It is a further object of the present invention to provide a nonisotropic solution which exhibits electret and/or piezoelectric properties when subjected to an electric field.

It is a further object of the present invention to provide a nonisotropic solution which can function as a memory element or volatile memory backup device, an insulator, a semiconductor, a rectifier or similar device useful in electronic equipment.

It is a further object of the present invention to provide a nonisotropic solution which can generate and/or reflect electromagnetic waves.

It is a further object of the present invention to provide a nonisotropic solution which can be repetitively and sequentially charged by application of an electric field and discharged and that may be utilized in devices for storing electrical energy.

It is a further object of the present invention to provide a nonisotropic solution having a polarized liquid crystalline microstructure comprised of a mixture of fatty acid salt molecules, water with or without an electrolyte compositionally defined so that a neat soap microstructure is formed.

It is a further object of the present invention to provide a polarized material having a smectic liquid crystalline microstructure having a lamellar configuration that is useful in electrical storage devices.

It is a further object of the present invention to provide a nonisotropic solution which slowly discharges in response to a load and recharges itself due to a high dielectric absorption.

It is a further object of the present invention to provide a primary battery with a nonisotropic solution as an electrolyte.

It is a further objective of the invention to provide a super capacitor which includes a nonisotropic solution as an electrolyte.

It is a further objective of the invention to provide a super capacitor having a very high capacitance.

It is a further objective of the invention to provide a super capacitor having a small area and volume as compared to prior art devices and which is operative at high temperatures.

In accordance with the aforementioned objects the present invention provides a composition comprising a nonisotropic solution including only an amphiphatic compound, or an amphipatic compound and a liquid. The polarizable materials of the present invention may exhibit useful electret, ferroelectric, pyroelectric, semiconductor, insulator and transducer properties and particularly a high capacitance when subjected to an electric field. The term "nonisotropic" as used herein refers generically to the phases of a selected amphiphatic compound outside the isotropic solution region, e.g., all of the phases to the left of the line that defines isotrophic solutions of sodium palmitate in FIG. 2. It has been found that the materials described herein exhibit advantageous properties even below the 50° C. line of FIG. 2 and therefore FIG. 2 has been included only as an illustration.

The present invention also provides an electrical device characterized by a polarizable material comprising a nonisotropic solution having a liquid crystalline microstructure, preferably lamellar, composed of an amphiphatic compound and a liquid and electrical transmission means connected thereto. Alternatively the nonisotropic solution may comprise a polymorphic solid micellar solution. The term electrical transmission means is used herein to refer to any means for coupling the polarizable materials of this invention to an electrical circuit.

The preferred amphiphatic compounds are salts of a fatty acids and preferably selected from a group consisting of alkaline metal, alkaline earth metal, ammonium and alkanol-ammonium salts of the fatty acids. The preferred liquid is water or heavy water and may further include a electrolyte such as a soluble ionic salt, e.g., NaCl.

The amphiphatic compounds described above at relatively high temperatures form various phases of neat soaps and have various liquid crystal microstructures. When these compounds are cooled polymorphic solid micellar solutions are obtained. It was found that the amphiphatic compounds have desirable electrical properties in either the liquid crystal microstructure or the polymorphic solid micellar solution state. The term nonisotropic solution includes amphiphatic compounds in both states. Furthermore, solid micellar solutions may have advantageous electrical properties, such as a high dielectric constant even if they were not formed by cooling an amphiphatic compound having a liquid crystal microstructure such as a neat soap.

The polarizable materials of the present invention having necessary microstructure may be a simple binary mixture of an amphiphatic compound and a liquid in appropriate quantities.

It has been discovered that the nonisotropic solution of the present invention may be utilized as a dielectric in a parallel plate capacitor device. The device may be charged with a DC current and the charged device discharges in response to a load at first quickly in a manner that would be expected for a capacitor and then more slowly in a manner that would be expected for a storage battery. Interestingly, the electrical potential of the device is not instantaneously discharged by shorting and restores itself when the load is removed due to the high dielectric absorption of the material.

It has been further discovered that a primary battery, i.e., a battery which needs no initial charging is obtained when the nonisotropic solution of the present invention is used as an electrolyte disposed between two dissimilar electrodes.

BRIEF DESCRIPTION OF THE DRAWINGS

The various properties and characteristics of the present invention will now be further illustrated and better understood by reference to the following drawings.

FIG. 23 is a table illustrating the fatty acid distribution in common fatty acid source materials.

DETAILED DESCRIPTION OF THE INVENTION

Figure 1:
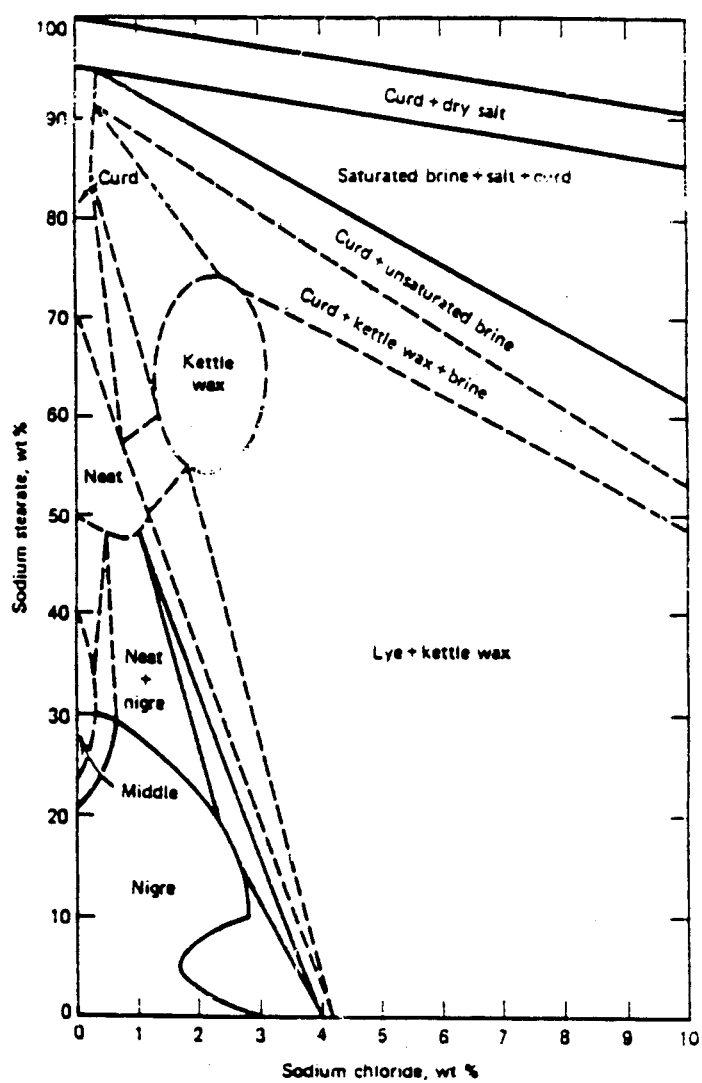
FIG. 1 is a phase diagram of a ternary system of sodium stearate- sodium chloride-water at 90° C. reprinted, with permission of the publisher from KirkOthmer "Encyclopedia of Chemical Technology", Vol. 21 (3d Ed. 1979), John Wiley & Sons, Inc.

The compositional nature and the electrical behavior of the materials of the present invention will now be discussed in more detail.

The amphiphatic compounds used in the practice of this invention include molecules having a polar or hydrophilic end and non-polar or hydrophobic end and each of these ends is large enough to display its own solubility behavior in the liquids as hereinafter described. The amphiphatic compounds are known to orient themselves in polar liquids so that their nonpolar ends (e.g., the hydrocarbon portion of a soap molecule) dissolve in one another while their polar ends (e.g., the—COO—groups) project outwardly into the polar solvent thus exhibiting a controlled preference in orientation that produces liquid crystals. This orientation is reversed in non-polar solvents, Morrison and Boyd, Organic Chemistry, Chpt. 33 (3d Ed. 1973); Kirk-Othmer "Encyclopedia of Chemical Technology" Vol. 14, p. 395 et seq.) (3d Ed. 1980). Preferred amphiphatic compounds for use in this invention include salts of fatty acids, such as, alkali metal salts, alkaline earth metal salts, ammonium salts and alkanolammonium salts, more particularly sodium, lithium, potassium rubidium and cesium salts. These preferred fatty acid salts may include a saturated or unsaturated aliphatic moiety of about 6 to 18 carbon atoms, for example, sodium oleate, stearate or palmitate. Other exemplary salts include, cesium myristate, ammoniumlaurate, triethanolamine stearate, triethanolamine laurate, and alkyl polyglucoside APC Burco NPS-225 available from Burlington Chemicals of Burlington, N.C., U.S.A.

Other amphiphatic compounds useful in the practice of this invention include alkane sulfonates, preferably having $C_2$ to $C_{15}$ alkyl groups; alpha-olefin sulfonates, preferably having 9 to 15 methylene units; fatty alcohol sulfates, preferably having a $C_{11}$ to $C_{17}$ alkyl group; oxo alcohol ether sulfates, preferably including $C_2$ to $C_{11}$ alkyl groups and 1 to 4 ethoxy groups; and cationic surfactants such as quaternary ammonium salts, preferably including four $C_1$ to $C_{18}$ alkyl groups; amine oxides, preferably including a $C_{12}$ to $C_{18}$ alkyl group; and amphoteric surfactants such as betaines (which may be sulfonated) preferably having a $C_{12}$ to $C_{18}$ alkyl group and nonionic surfactants such as alkylphenol ethoxylates having a $C_8$ to $C_{12}$ alkyl group and 5 to 10 ethoxy groups; fatty- or oxo-polyethylene glycol ethers having a $C_6$ to $C_{16}$ alkyl group and 5 to 10 ethoxy groups; ethylene oxide-propylene oxide copolymers, preferably including 2 to 60 propoxy and 15 to 80 ethoxy groups; fatty alcohol polyglycol ethers preferably including a $C_8$ to $C_{18}$ alkyl group, 3 to 6 ethoxy and 3 to 6 propoxy groups. Among the preferred nonionic surfactants are the polyethylene oxide (PEO) polymers characterized by the formula

where n=2 or more; and R and $R_1$ are either hydrogen or a $C_{12}$ to $C_{16}$ alkyl. For example, such polyethylene oxides are available from Shell Oil Company, Woodbury, N.J., U.S.A. under the trade designations N23-5, N25-3, N46-3 and N45-13.

Presently, the most preferred fatty acid salts are commercial soaps which are typically mixtures of the sodium salts of fatty acids of even carbon number ranging from about 12 to 18 carbons. Commercial soaps may be made by well known methods such as the hydrolysis of saponifiable fats, grease and oils such as, tallow and other animal fats; cottonseed oil and other vegetable oils and fats; fish oils, rosin and other resinous substances; and coconut oil, palm kernel oil, babassu oil, palm oil, olive oil, tall oil, castor oil, groundnut oil, linseed oil and hydrogeneated versions of these fats and oils. The fatty acid content of useful fatty acid source materials are listed in FIG. 23. Conventional soap making processes are described in U.S. Pat. Nos. 2,037,006; 2,190,592; 2,336,893; 3,793,215; 3,296,829; 4,201,743 and 4,490,280. However, as illustrated below simple soap systems have also been found to be effective.

A kettle process for the preparation of neat soap is described in U.S. Pat. No. 3,928,829 the text of which is incorporated herein by reference. Briefly, the steps in preparing a neat soap are (1) the "killing or saponification stage" in which an aqueous solution of fatty acid source material, e.g., a 75/25 mixture of tallow and coconut oil, is heated with caustic, e.g., sodium hydroxide, to convert a substantial portion of the fatty acids to their salts; (2) the "change stage" in which the fatty acid salts are precipitated out of the solution; and (3) the "fitting stage" in which the neat soap phase (that is, the portion of the mixture that has a lamellar liquid crystal microstructure) is removed from the neat phase. Of course, neat soap may be made by other soap making processes well known to those skilled in the art.

It has also been found that commercially available solid soaps are useful in this invention, as illustrated in greater detail in the examples which follow.

The liquid in the polarizable material of this invention is provided in sufficient quantity and selected to enable the amphiphatic compounds to organize into the desired liquid crystal microstructure. The preferred liquid components are polar liquids, particularly water. The liquid component should also solubilize any electrolyte included in the polarizable material.

The preferred neat soaps of this invention include about 50 to 100% wt. fatty acid salts which may be derived from any fatty acid salt source material; about 10 to 30% wt. water and about 0 to 4% wt. sodium chloride more preferably about 0.3 to 1.2% wt. sodium chloride. However, the electrolyte may be excluded altogether. Useful fatty acid salt source materials are listed above and typically fatty acid distributions for such source materials are summarized in FIG. 23. The fatty acid source materials may be used alone or in various combinations to adjust the constituent fatty acid salts in the soap, e.g., 25% wt. tallow and 75% wt. coconut; 60% wt. tallow and 40% wt. coconut; or 85% wt. tallow and 15% wt. coconut.

It will be appreciated by those skilled in the art that the orientational associations of molecules in liquid crystal microstructures, such as neat soaps, are extraordinarily sensitive to external perturbations and that changes in temperature, pressure and electrical and magnetic fields may cause significant changes in the long range order of the molecules.

Solid bar soaps are usually prepared from neat soap by drying; reducing the size of the dry material by chipping, chopping, or the like; mixing the dry particles with no more than about 20% wt., and preferably less than about 2% wt., of additives such as fragrance, colorants, emollients, antibacterials, preservatives and the like; and shaping the mixture into bars or some other desired shape usually by extrusion. The smectic lamellar microstructure that characterizes neat soaps is changed, primarily by mechanical forces, during preparation of solid bar soap, temperature and moisture. The solid bar soap microstructure is characterized by an interlocked mesh of fiber bundles of varying diameters and different degrees of twist but with a general tendency toward retaining both a criss-cross and a parallel structure. The microstructure of solid bar soap is referred to herein as 'bar phase' microstructure.

As previously mentioned, neat soaps may also be cooled to form polymorphic micellar solid solutions. Specific solid solutions are recited in Examples XIV–XXIX.

The electrolyte employed in this invention may be a simple ionic salt such as sodium chloride and may be present either as an impurity from the process of making the amphiphatic compound or as an additive derived from some other source. The quantity of electrolyte should not exceed the amount at which the electrical resistance of the material becomes less than the amount at which the neat phase microstructure is disrupted, e.g., in commercial soaps more than about 4% wt. NaCl disrupts the neat phase. Generally, the salt content is at least about 0.1% wt.

The amphiphatic compounds and liquid are combined in the necessary compositional amounts to produce the desired microstructure structure in the nonisotropic region. For example, with commercial soaps the necessary compositional amounts may be determined by locating the neat phase region on the McBain phase diagrams. A discussion of McBain's phase diagrams of binary and ternary systems of soap-water and soap-salt-water appears in Kirk-Othmer "Encyclopedia of Chemical Technology", Vol. 21, pp. 166–170 (3d Ed. 1980). The phase behavior of the polar liquid, and amphiphatic components of soap in the neat phase appear to enhance the polarizable material's electric properties.

Figure 2:
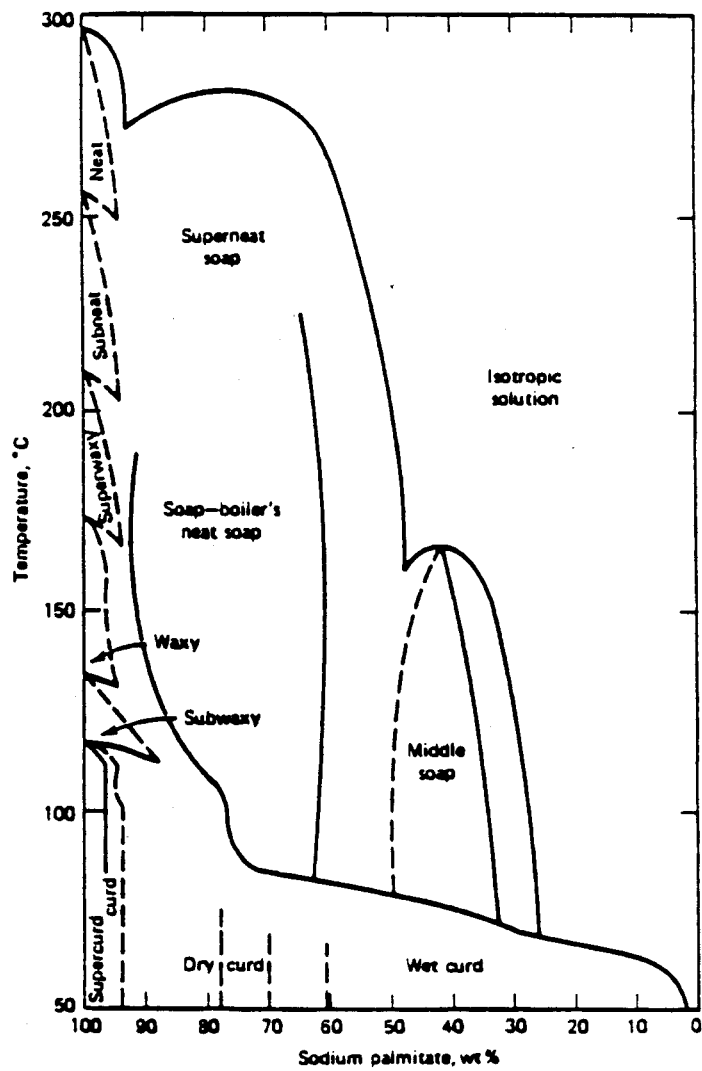
FIG. 2 is a binary phase diagram for sodium palmitate —water reprinted, with permission of the publisher, from Kirk-Othmer "Encyclopedia of Chemical Technology", Vol. 21 (3 Ed. 1979), John Wiley & Sons, Inc.

FIG. 1 illustrates a ternary system of sodium stearate, sodium chloride and water at 90° C. FIG. 2 illustrates a binary system of sodium palmitate and water. As seen from FIG. 2, the nonisotropic solution can take on various microstructures including neat, subneat, superwaxy, waxy, subwaxy and middle soaps. The nonisotropic solution could also be a polymorphic solic micellar solution identified as supercurd, dry and wet curd. Comparison of FIGS. 1 and 2 illustrates that a system comprised of approximately 70% soap and 30% water and only a residual amount of salt (e.g., less that 0.5% wt.) falls within the neat phase structural range or region.

A notable property of soap in the neat phase is the solid-like consistency of the system, i.e., it may be readily manufactured in bar, flake or bead form. A heretofore unappreciated property of such solid-like systems in the neat phase is an unexpectedly high dielectric constant. Furthermore, it was discovered that other nonisotropic solutions also have unexpectedly advantageous electrical properties. Another unappreciated property of such systems is their ability to generate electric current when used with two dissimilar electrodes.

Large variations of the dielectric constant (E) of the nonisotropic material of this invention with temperature have been observed and their dielectric properties have shown sensitivity to fatty acid salt and water concentration. Although not fully understood, the large dielectric constants of these liquid crystal materials is believed to be associated with some structural phase transition of a ferroelectric type. Ferroelectric compositions exhibit a phase showing a twin or domain structure in which individual domain states may be reoriented by applied electric fields and they may also be responsive to magnetic and elastic stress fields and various combinations thereof.

Figure 3:
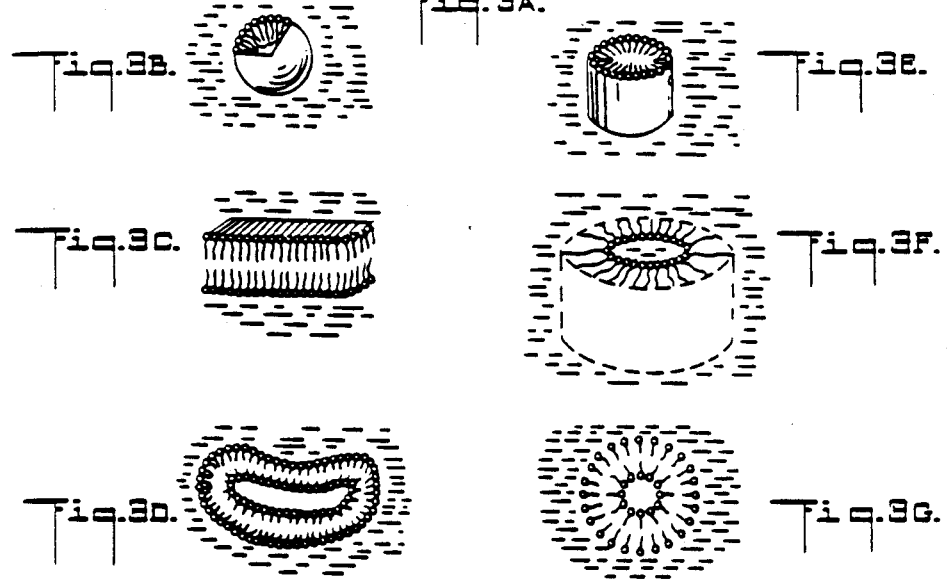
FIG. 3 illustrates the microstructural arrangements in lyotropic systems of mesomorphic or amphiphilic molecules having a spherical or lamellar configuration reprinted, with permission of the author and publisher, from G. H. Brown and J. J. Walken, "Liquid Crystals and Biological Structure", 1979 Academic Press, Inc.

It is also possible that the advantageous electrical properties of neat soaps result from a structural phase transition that affects e.g., the liquid crystalline lamellar or micelle microstructure illustrated in FIG. 3 or the bar phase microstructure of solid bar soaps.

The microstructures of the composition of the present invention may be characterized as a liquid crystal microstructure. The terms "liquid crystal" and "mesomorphic" may be used to describe physical properties of the materials of this invention because these materials exhibit a dualism of physical state, i.e., both solid and liquid behavior. The liquid crystalline behavior of amphiphatic compounds is discussed in Kirk-Othmer "Encyclopedia of Chemical Technology", Vol. 14, pp. 395–427 (3d Ed. 1980) which is incorporated herein by reference. These properties are believed to be dictated or derived from orientational ordering of the constituent molecules of the materials in response to the liquid which impart the solid-like properties to the materials although these attractive and ordering forces are insufficient to totally exclude liquid properties. The liquid crystal material of this invention is lyotropic in the sense that it is a multicomponent system and the ordering/orientating, e.g., formation of lamellar, bar phase, micelle or other microstructures, by the constituent molecules (amphiphatic compound) results from the action of the liquid (water).

It should be understood that mixtures of the amphiphatic compounds disclosed herein which provide a liquid crystal microstructure are within the scope of the invention.

Detailed embodiments of the invention will now be described in the following examples.

EXAMPLE 1

The dielectric constants of bulk samples of various commercially available solid bar soaps were tested for the variation of their dielectric constant over temperature. In the examples which follow these samples will be referred to by their registered trademarks. Palmolive ®, Irish Spring ®, and Cashmere Bouquet ® are registered trademarks of the Colgate Palmolive Company. The dielectric constants of Palmolive ®, Irish Spring ® (superfatted), Cashmere Bouquet ® and standard brand commercially available solid bar soap hereinafter referred to as soap A were measured at a frequency of 1 kHZ over a temperature range from 21° C. to 160° C. Very strong temperature variations in the real component of the complex dielectric constant E, were observed at temperatures ranging from about 10° C. to 130° C. depending on the composition of the solid bar soap. This variation was found to be dependent in part on the water content of the solid bar soap, for example, Irish Spring ® (superfatted) solid bar soap with 10% wt. water showed an E' peak value of 1,488,000 at 118° C. and Irish Spring ® (superfatted) solid bar soap with a water content of 15% wt. had an E', peak value of 5,861,000 at 107° C. From these observations it was concluded that the dielectric constant exhibited strong sensitivity to the solid bar soap composition and water concentration. As mentioned above the enormous increase in dielectric constant with temperature suggests a structural phase transition of a ferroelectric type. E' values were measured for the various bar soaps as follows.

Figure 4:
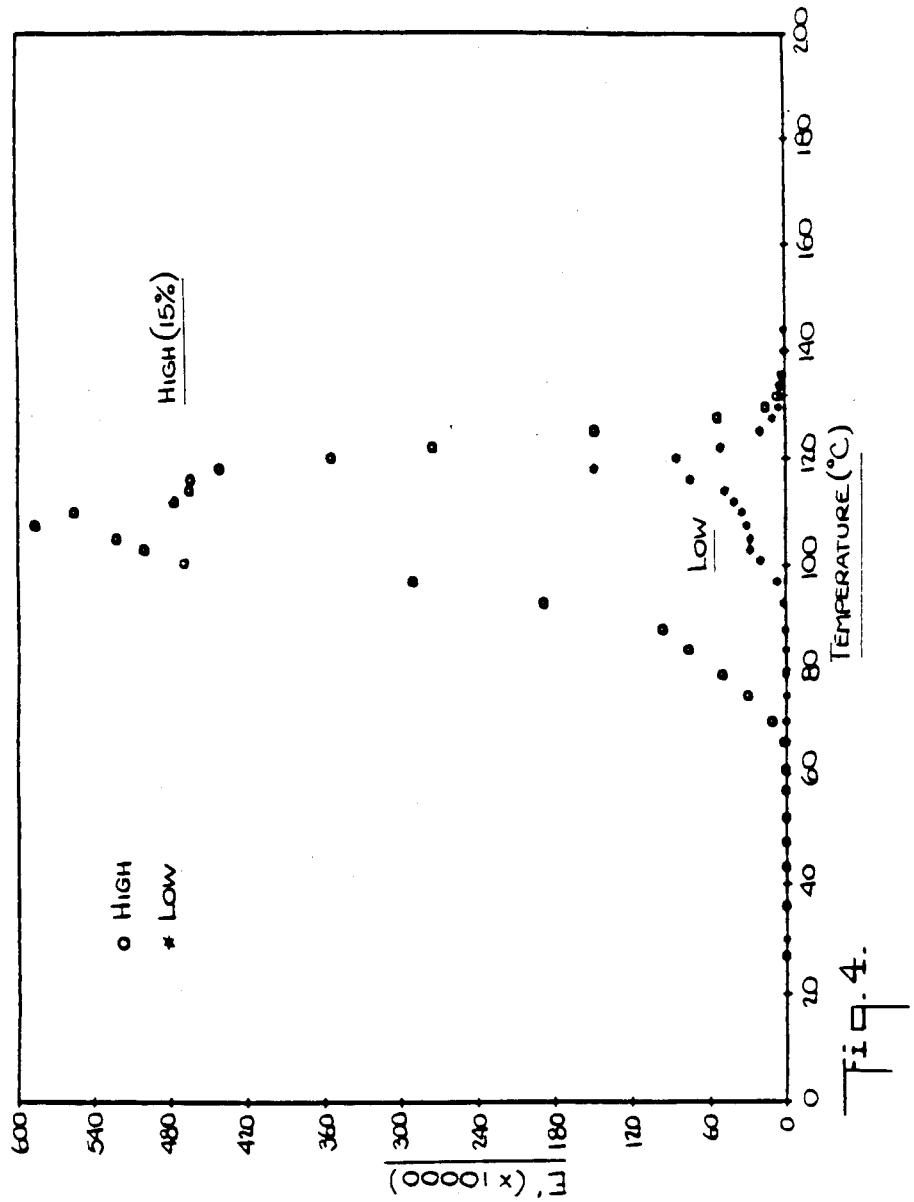
FIG. 4 illustrates the variation of the real component of the dielectric constant E, with temperature for samples of solid bar soaps having a 10% wt. and 15% water content as set forth in Example I.
Figure 5:
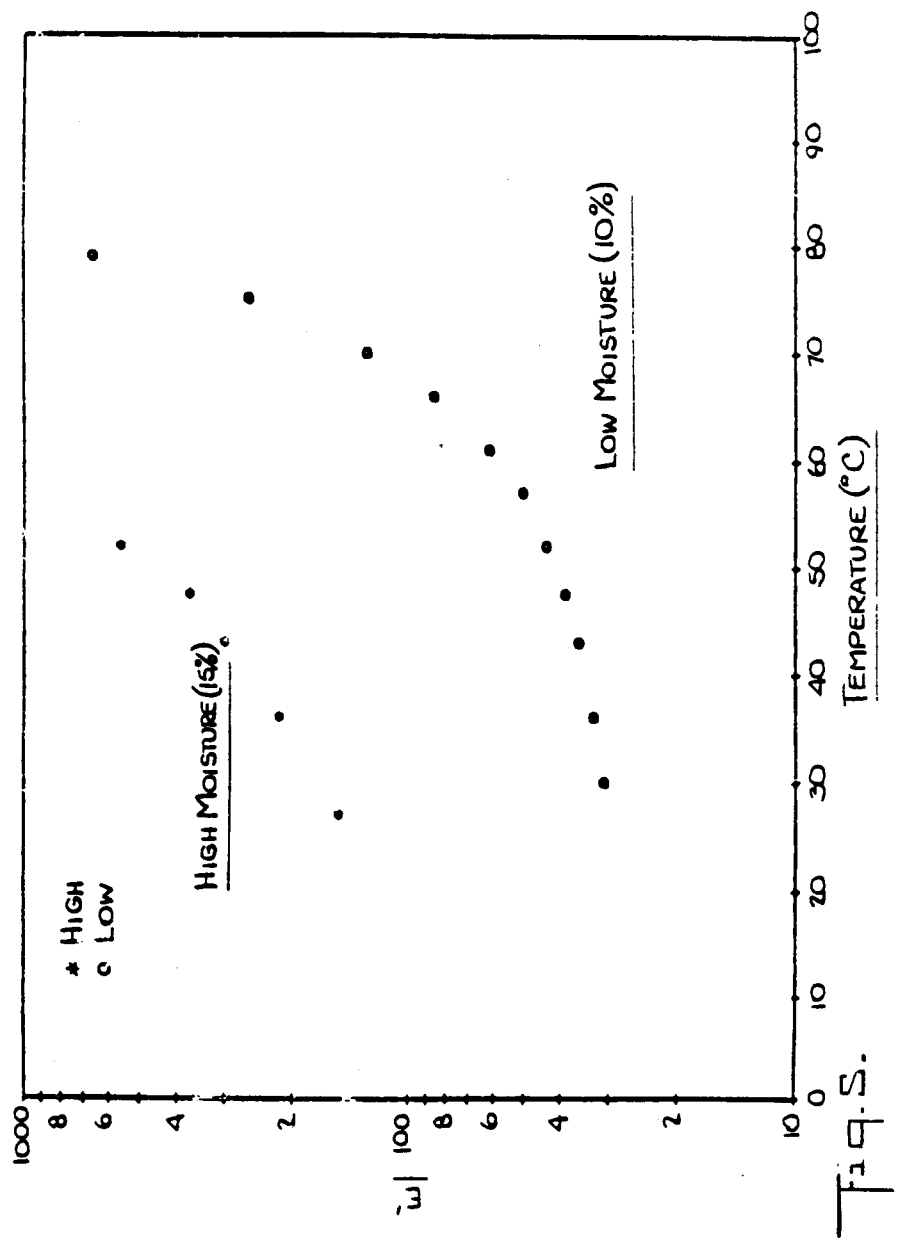
FIG. 5 illustrates on an expanded scale the variation of the real component of the dielectric constant E' with temperature for samples of solid bar soaps having a 10% wt. and 15% wt. water content as set forth in Example I.

Samples of bar soap ⅜" thick by 2" wide by 3" long were cut by milling and placed between two flat, parallel gold plated electrodes. The samples were clamped between the two gold plated capacitor electrodes and held in place with electrically insulating bolts so that the surfaces of the soap made good contact with the electrodes but did not plastically flow. The upper electrode was divided into a circle 1 ½" in diameter and a guard ring 4" in diameter which was electrically insulated from the center electrode. The base electrode was a 4" diameter circular plate. The electrodes were then connected through three coaxial cables to a General Radio 1615-A Capacitance Bridge. A General Radio 1311-A oscillator set at 1 khz was used to drive the bridge. A Princeton Applied Research HR-8 amplifier sensitive to phase was used as a null detector to balance the bridge. The mounted sample was placed in a stainless steel thermos and heated by resistive heaters directly connected to the electrodes. The temperature was measured with chrome-aluminum thermocouples attached to the electrodes. Heating rates were approximately 2° C. per minute. Samples were checked for water loss by weighing before and after heating, and showed negligible weight loss (less than 0.1% wt.) which occurred mostly along the edges of the samples which were outside the central 1 ½" electrode which was used for measurement in the three electrode technique. Capacitance values were measured using the in-phase component and the out-of-phase component of the dielectric response. At temperatures above 80° C. the capacitance typically would exceed the upper range of the bridge (1 microfarad) and so external capacitors were added to the circuit. With external capacitors the mutual conductance could not be balanced and consequently imaginary parts of the dielectric constant could not be measured. From the primary capacitance measurements, the real component of the dielectric constant ' was calculated using the thickness (⅜ inch) of the sample and the central electrode area. No attempt was made to correct for possible electrode fringe effects. Subsequent d.c. measurements between the electrodes showed a resistance in the hundreds of megohms at room temperature. High d.c. voltages resulted in permanent polarization of the soap into an electret. The electrets exhibited piezoelectric behavior and possibly permanent structural changes that made subsequent dielectric measurements impossible. FIGS. 4 and 5 illustrate the variation of the real component of the dielectric constant E' with temperatures for Irish Spring ® (superfatted) 10% wt. and 15% wt. water solid bar soaps. The appearance of the very narrow and very strong peak at 118° C. in the 10% wt. water sample strongly suggests a structural phase transition of the sort observed in ferroelectric materials at their critical temperature.

As illustrated in FIGS. 4 and 5, the effect of water addition to the bar soap is to increase the dielectric constant so that at 27° C., E'=52K, and at 107° C., E'=5,861,000. FIG. 5 shows that even at 40° C. there is nearly a tenfold difference between the value of real component of the dielectric constant E' for the 10% wt. water solid soap bar sample and that of the 15% wt. water solid soap bar sample.

EXAMPLE II

Figure 6:
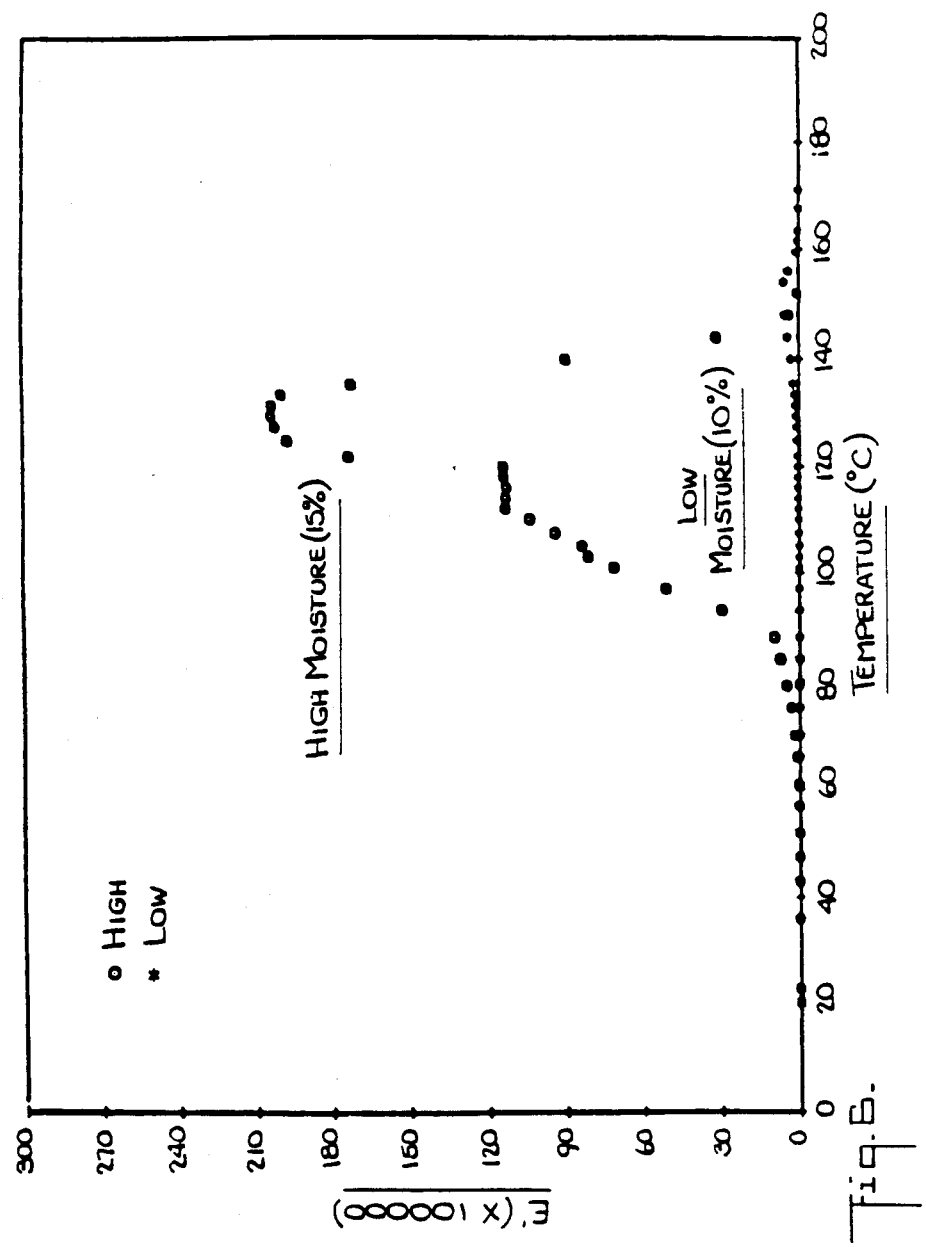
FIG. 6 illustrates the variation of the real component of the dielectric constant E, with temperature for samples of solid bar soaps having a 10% wt. and 15% wt. water content as set forth in Example II.
Figure 7:
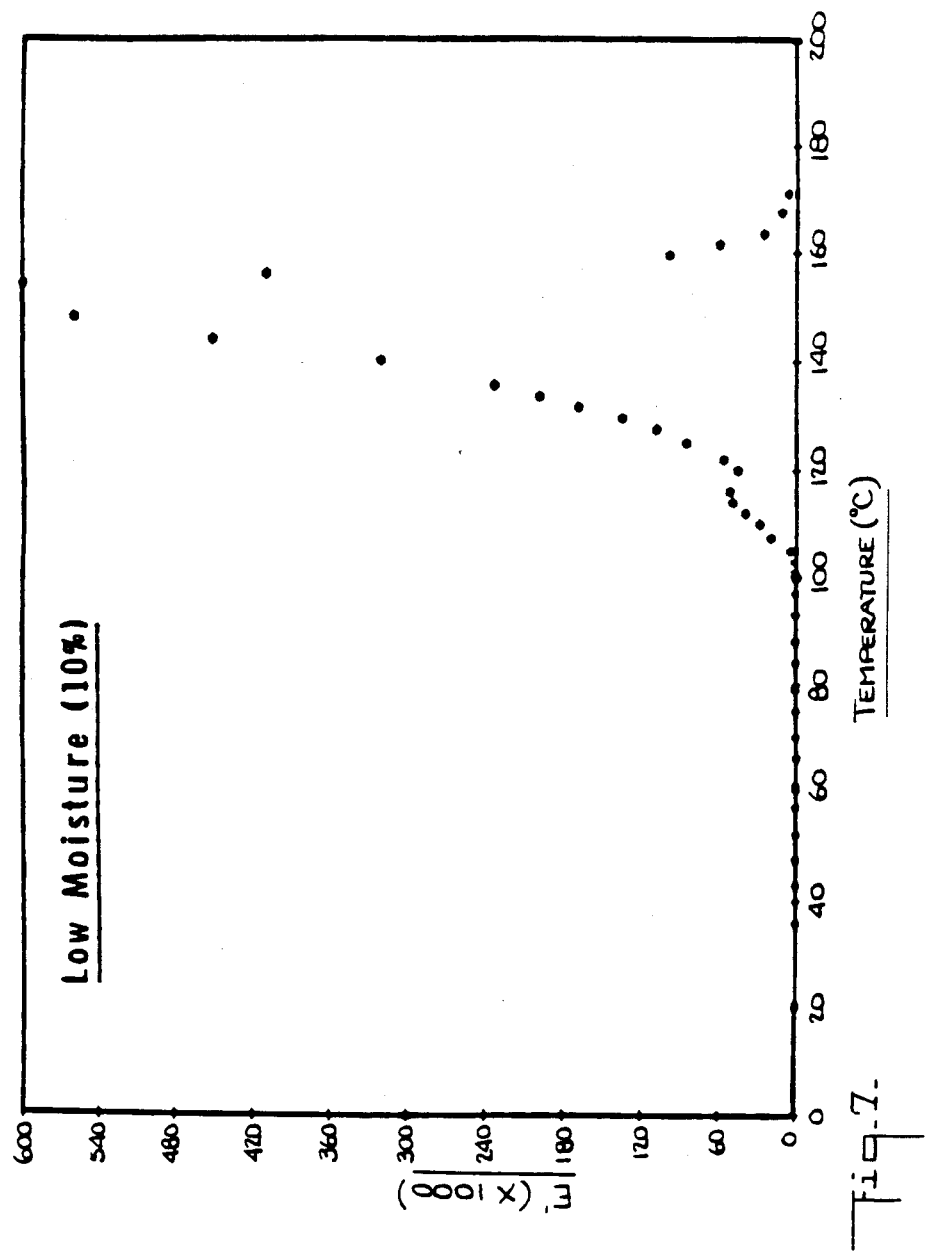
FIG. 7 illustrates on an expanded scale the variation of the real component of the dielectric constant E' with temperature for a sample of solid bar soap having a 10% wt. water content as set forth in Example II.

The variation of the real component of the dielectric constant E' of Palmolive ® solid bar soap with temperature was determined in accordance with the method described in Example I. FIG. 6 illustrates the variation of the real component of the dielectric constant E' with temperature for Palmolive ® 15% wt. water soap and Palmolive ® 10% wt . water bar soap. An expanded scale illustration of the variation of E' with temperature for low moisture (10% wt. water) Palmolive ® solid bar soap is depicted in FIG. 7. In FIG. 7 peaks occur at 118° C. and 150° C. and the E' values observed were higher than those observed in the testing of the Irish Spring ® solid bar soaps described in Example I. It may also be observed by comparison of FIGS. 6 and 7 that changes in the solid bar soap moisture content shifted the temperature location of the E' peaks.

Figure 8:
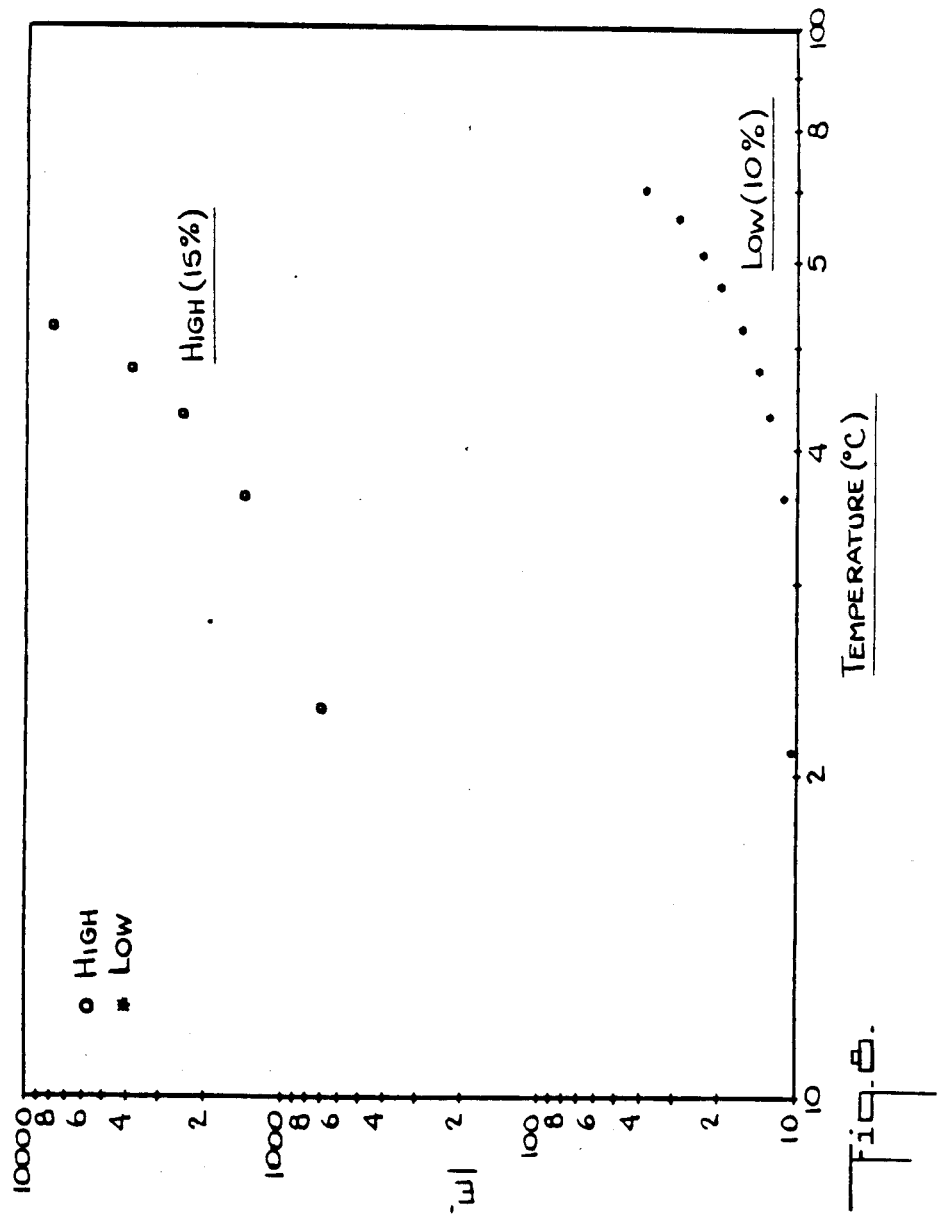
FIG. 8 illustrates on an expanded scale the variation of the real component of the dielectric constant E' with temperature for solid bar soap having a 10% wt. and 15% wt. water content as set forth in Example II.

FIG. 8 provides an expanded scale comparison of the dielectric constant of the 10% wt. water and 15% wt. water Palmolive ® solid bar soaps with temperature.

EXAMPLE III

Figure 9:
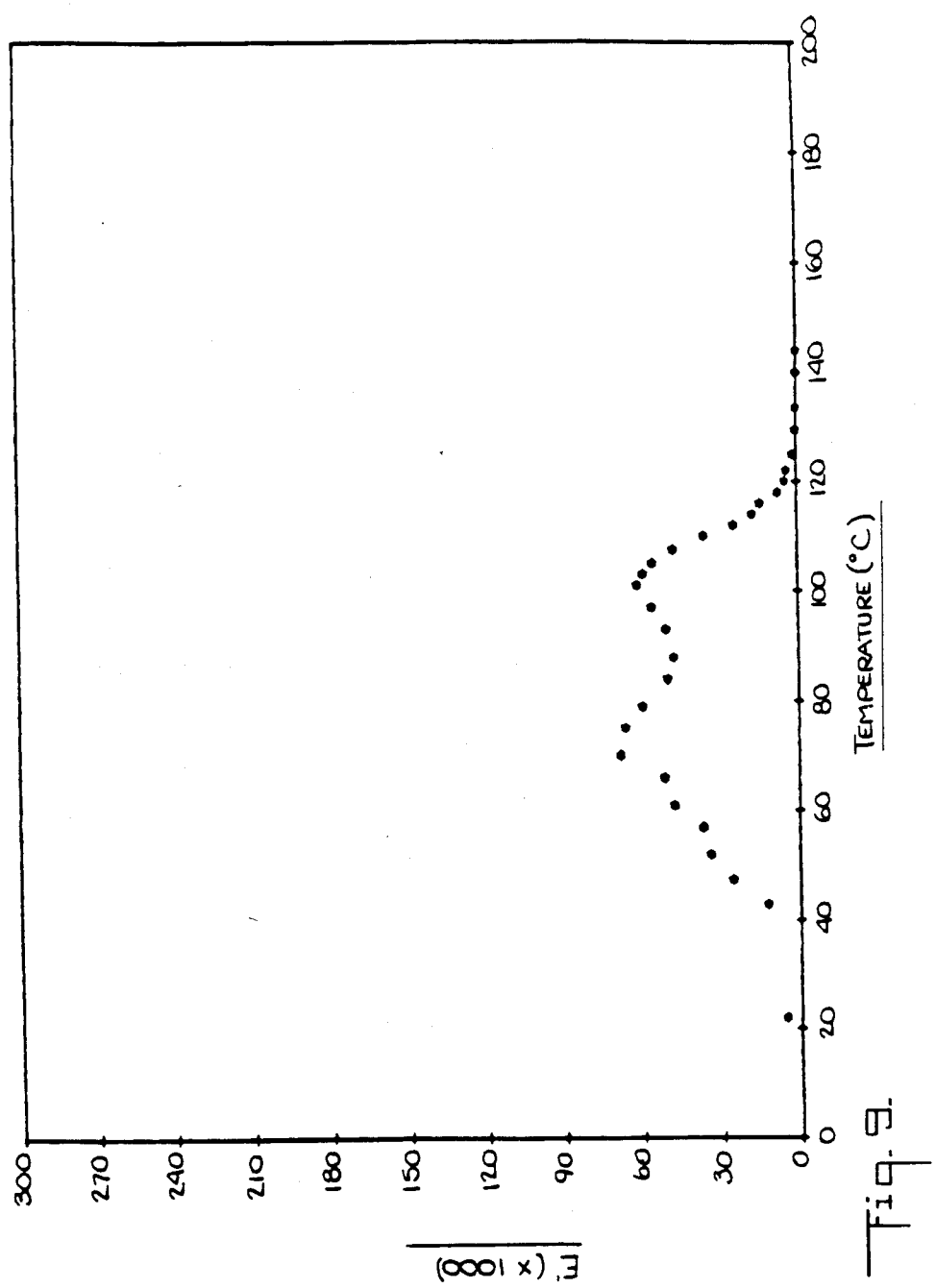
FIG. 9 illustrates the variation of the real component of the dielectric constant E' with temperature for solid bar soap A as set forth in Example III.

The variation of the real component of the dielectric constant E' of solid bar soap A with temperature was determined in accordance with the method described in Example I. The values of the real component of the dielectric constant determined by this experiment are illustrated in FIG. 9.

EXAMPLE IV

Figure 10:
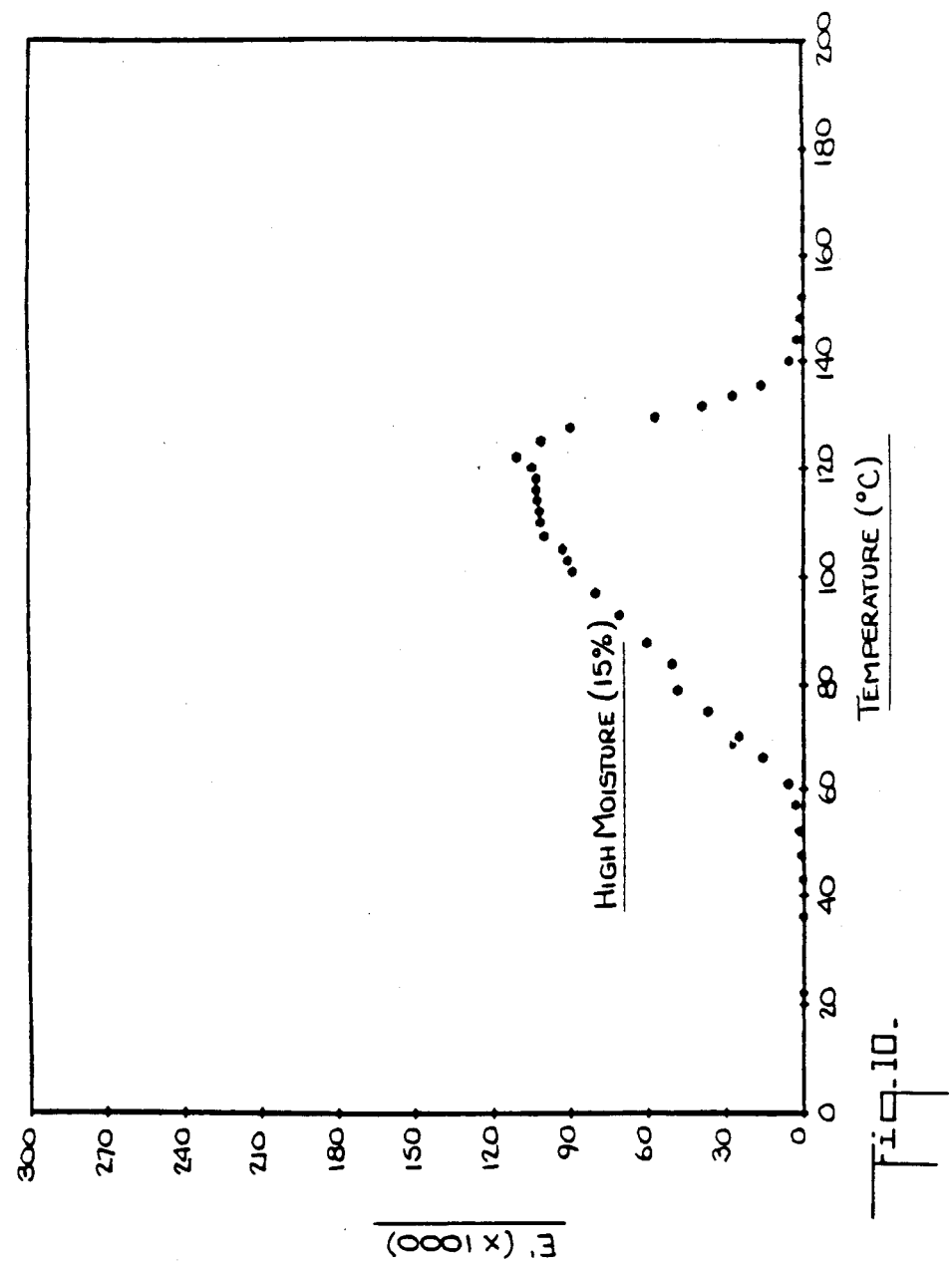
FIG. 10 illustrates the variation of the real component of the dielectric constant E' of solid bar soap with temperature as set forth in Example IV.

The variation of the real component of the dielectric constant E' of Cashmere Bouquet ® solid bar soap with temperature was determined in accordance with the method described in Example I. The values of the real component of the dielectric constant determined by the experiment are illustrated in FIG. 10.

Figure 11:
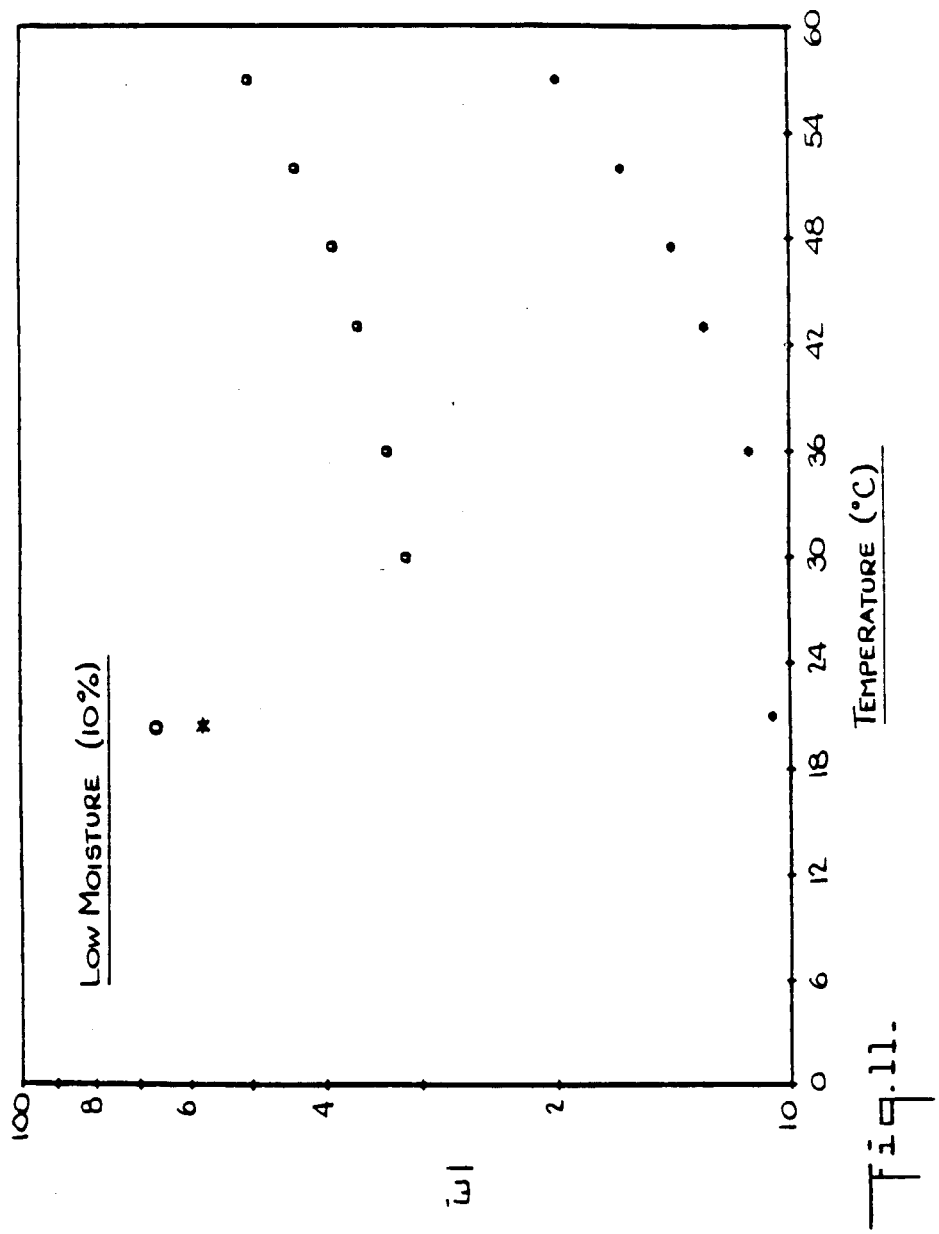
FIG. 11 illustrates the relative variation of the real component of the dielectric constant E' of 10% wt. water solid bar soaps with temperature as set forth in Examples I and II.
Figure 12:
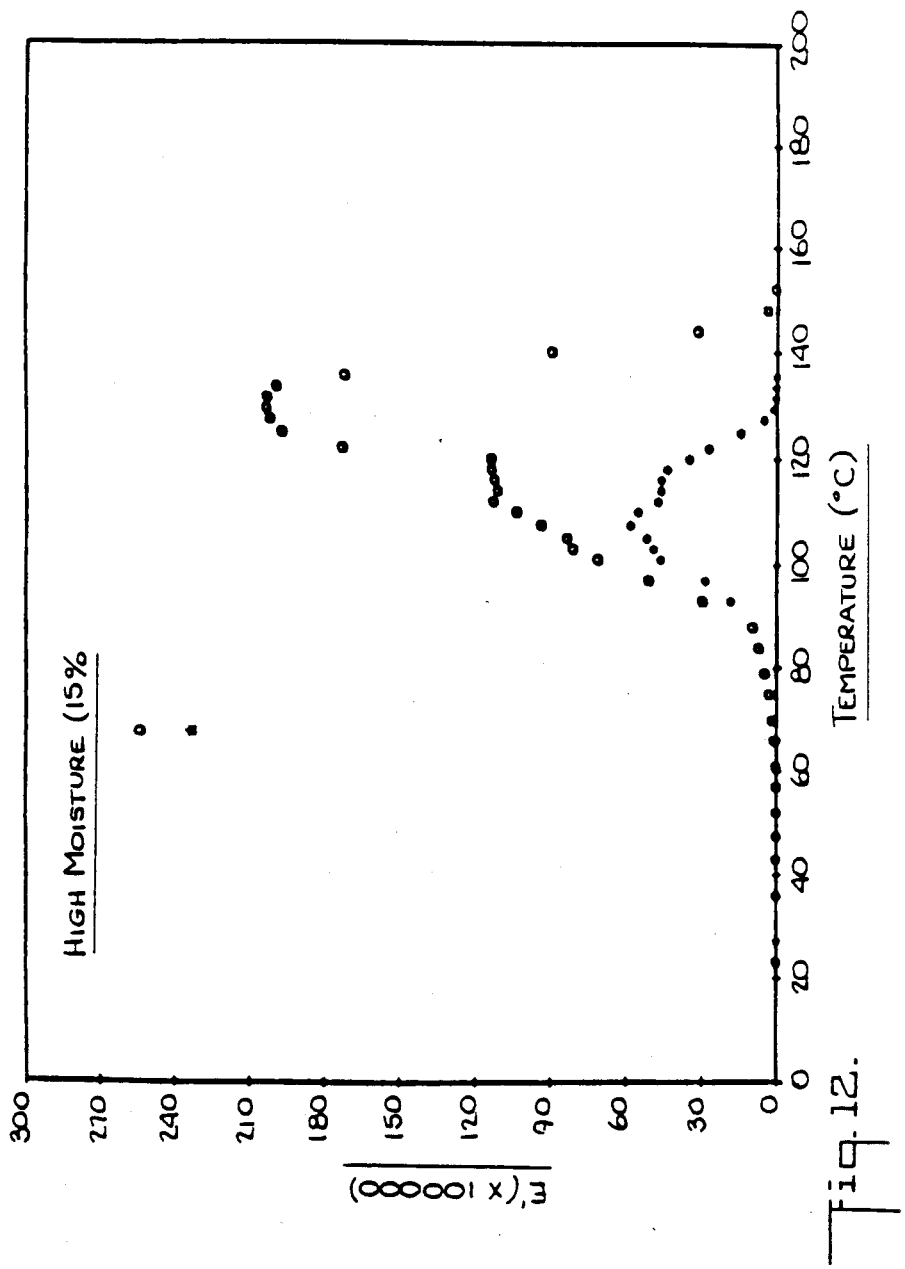
FIG. 12 illustrates the relative variation of the real component of the dielectric constant E' of 15% wt. water lid bar soap with temperature as set forth in Examples I and II.

FIGS. 11 and 12 illustrate the relative variation of the real component of the dielectric constants of 10% wt. water and 15% wt. water Irish Spring ® solid bar soap and Palmolive ® solid bar soap with temperature based upon the experiments described in Examples I-IV.

EXAMPLE V

Figure 15:
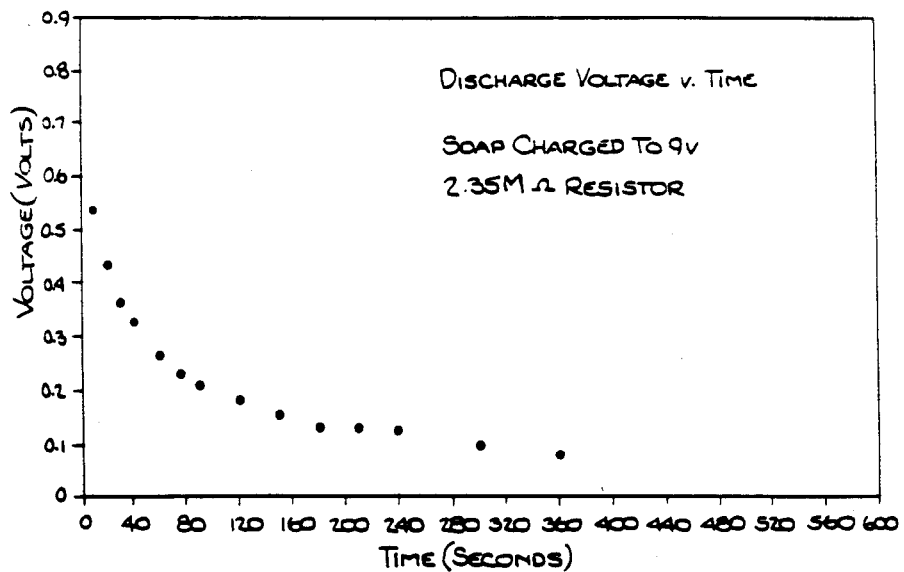
FIG. 15 illustrates the variation of the discharge voltage of the storage device described in Example V wherein a solid bar soap was employed as the dielectric.

Palmolive Gold ® solid bar soap was used as a dielectric in an electrical energy storage device made from single sided copper circuit board (2½ inch by 3¾ inch) with a ⅛ inch thickness of solid bar soap therebetween. Five such devices were connected in parallel and charged with 9 volts and their discharge measured through a 2.35 megaohm resistor. The resulting data is summarized in FIG. 15.

EXAMPLE VI

Figure 16:
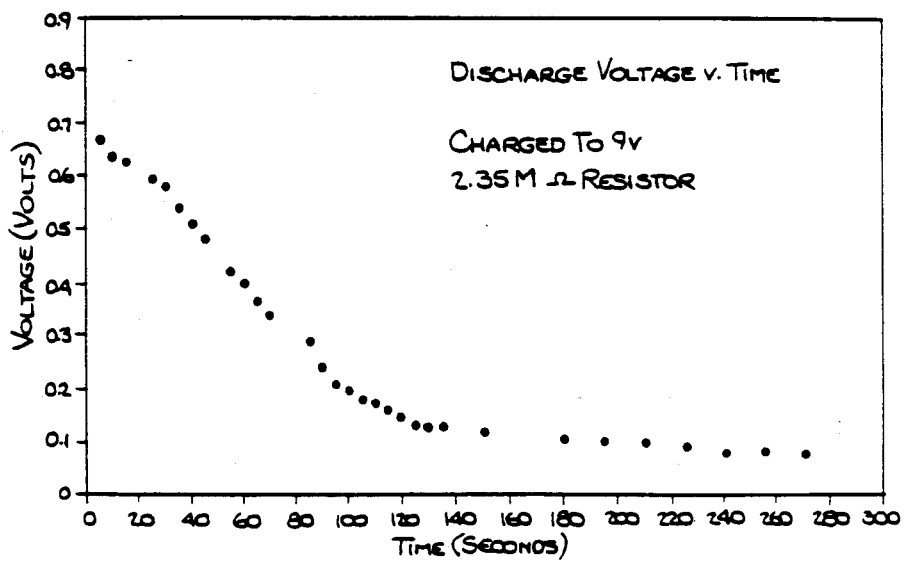
FIGS. 16 to 19 illustrate the variation of the voltage of the storage devices of Examples VI to IX employing solid bar soap A as a function of time.

Soap A solid bar soap was substituted as the dielectric in the storage device of Example V. The device was charged using a 9 volt power source for eight minutes and electrical discharge was measured through a 2.35 megaohm resistor. Discharge voltage as a function of time was recorded and is illustrated in FIG. 16.

EXAMPLE VII

Figure 17:
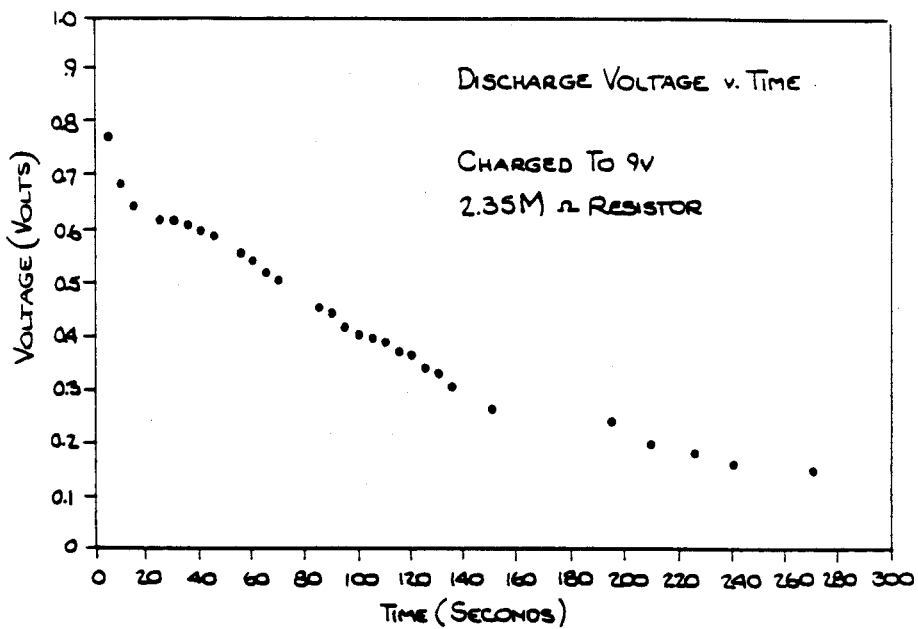

The storage device of Example VI was charged for 15 minutes to 9 volts at a temperature of 19° C. and subsequently discharged through a 2.35 megaohms resistor. The discharge voltage as a function of time was recorded and is illustrated in FIG. 17.

EXAMPLE VIII

Figure 18:
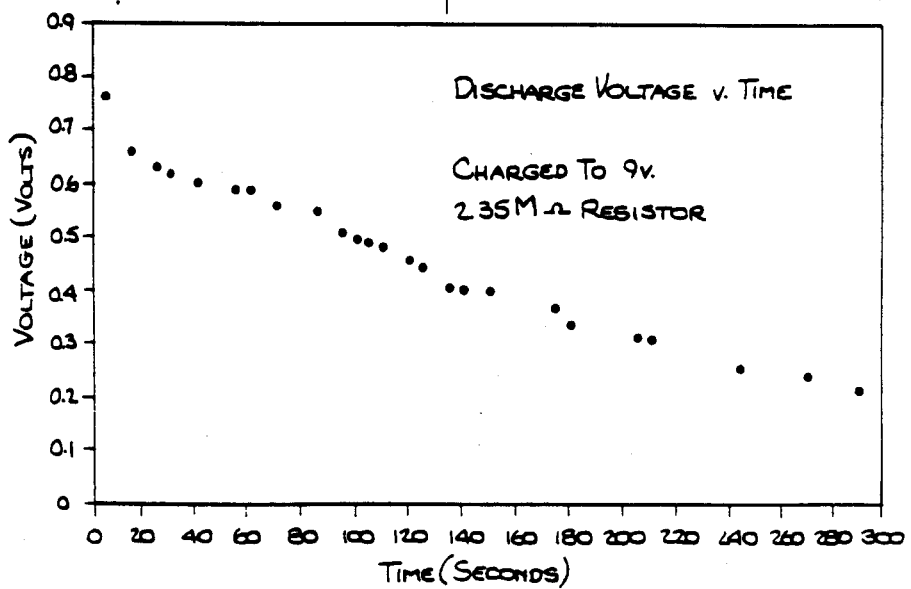

The storage device described in Example VI were charged to 9 volts for 31 minutes and then discharged through 2.35 megaohms resistor. The discharge voltage as a function of time was recorded and is illustrated in FIG. 18.

EXAMPLE IX

Figure 19:
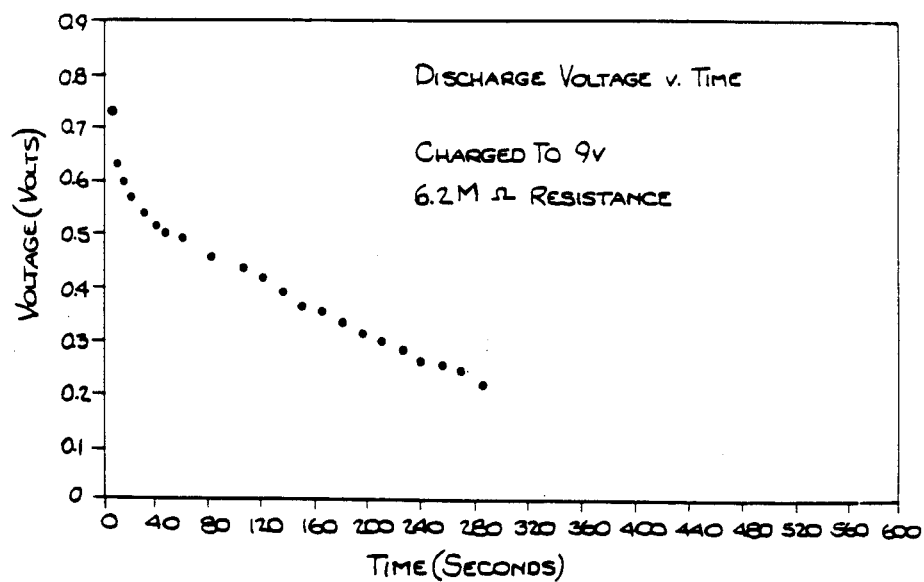

The storage device of Example VI was charged for 26 minutes to 9 volts. Soap A was employed as the dielectric. The device was then discharged through a resistance of 6.2 megaohms. The discharge voltage as a function of time is illustrated in FIG. 19.

EXAMPLE X

Figure 20:
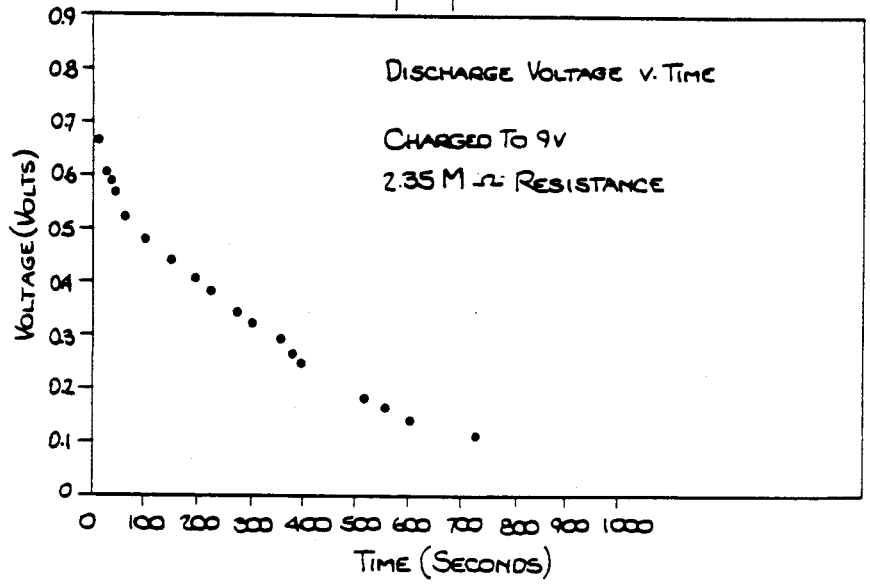
FIGS. 20-21 illustrate the variation of the voltage of the storage devices of Examples X and XI for various levels of charge and size of discharge loads.

Irish Spring ® solid bar soap was substituted as dielectric in the electric storage device described in Example V. The device was charged for 15 minutes to 9 volts at 22° C. and discharged through a 2.35 megaohm resistor. The discharge voltage as a function of time was recorded and is illustrated in FIG. 20.

EXAMPLE XI

Figure 21:
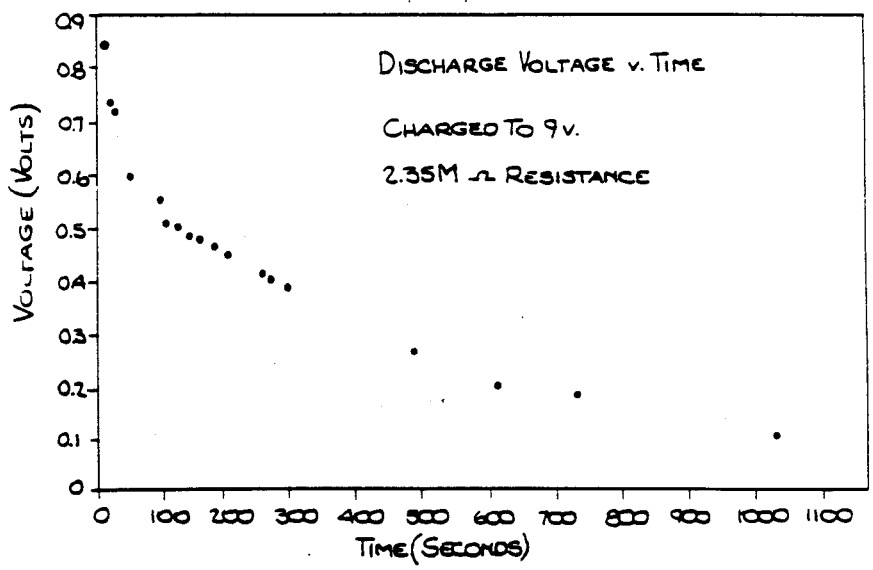

The storage device described in Example V was charged for a period of 30 minutes to 9 volts at 23° C. and then discharged through a 2.35 megaohm resistor. Irish Spring ® solid bar soap was used as the dielectric and the discharge voltage as a function of time was recorded and illustrated in FIG. 21.

EXAMPLE XII

Figure 13:
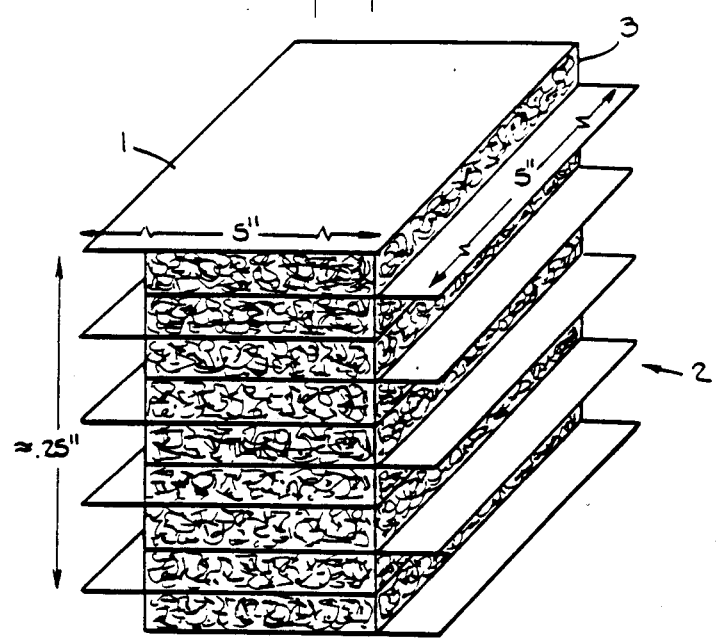
FIG. 13 illustrates an electrical storage device made in accordance present invention.

Individual capacitors were constructed from commercial metal foil 2 such as aluminum foil and sterile gauze fabric impregnated with neat soap 3, as shown in FIG. 13. The gauze employed provided both structural support for the neat soap and served to space the metal foil electrodes 2. The neat soap utilized in these capacitors was prepared from a blend of edible tallow and coconut oil, according to conventional batch methods. A tallow/coconut ratio of 75/25 (by weight) was employed. Each capacitor contained a total of 10 foil electrodes separated by 9 layers of gauze impregnated with neat soap. Each aluminum foil electrode had a surface area of 25 square inches. The carbon chain distribution of the&neat soap used in these capacitors is shown in Table 1. The moisture content of the neat soap was determined to be 25%.

Four electrical devices of the type shown in FIG. 13 were constructed. Each capacitor was then wrapped and heat sealed in a moisture barrier polymer film to reduce moisture loss. Small perforations were made in the polymer film to facilitate necessary electrical connections to the capacitors. In view of the abovenoted dependence of the electrical properties of the materials of this invention on moisture content means for preventing loss or gain of liquid from the materials during storage and use should be provided.

Figure 14:
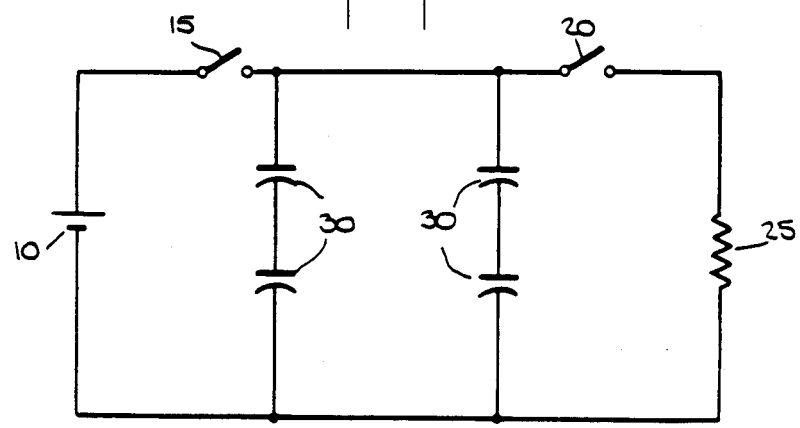
FIG. 14 is a schematic of the circuit used to measure the variation of the discharge voltage of the storage device of the present invention over time.

The capacitors were then configured in a circuit according to the schematic depicted in FIG. 14 and charged by a 9 volt d.c. voltage source by closing switch 15. Switch 15 was then opened and switch 20 closed to permit measurement of the discharge voltage of the storage devices 30 with a Bechman 360 digital voltmeter across resistance 25. The discharge voltage was measured as a function of time.

| Carbon Chain Length | Distribution % |
|---|---|
| 8 | 2.0 |
| 10 | 1.8 |
| 12 | 13.4 |
| 14 | 7.2 |
| 14/1* | 0.6 |
| 15 | 0.5 |
| 15/1 | 0.1 |
| 16 | 12.5 |
| 15/1 | 2.7 |
| 17 | 1.0 |
| 17/1 | 0.6 |
| 18 | 15.3 |
| 18/1 | 31.7 |
| 19 | 1.1 |
| 18/2 | 2.6 |
| 20 | 0.3 |
| 18/3 | 0.7 |

*indicates the number of unsaturated bonds in the aliphatic moiety.

TABLE 2

Capacitor Composition
Details of construction of the capacitor of Example XII.

| | | | | |
|---|---|---|---|---|
| Foil | 7.5 grams | 7.3 grams | 7.7 grams | 7.4 grams |
| Gauze | 6.9 grams | 6.7 grams | 6.8 grams | 6.8 grams |
| Soap | 96.7 grams | 88.9 grams | 89.3 grams | 79.4 grams |
| Total | 111.1 grams | 112.9 grams | 103.8 grams | 93.6 grams |

EXAMPLE XIII

The storage device described in Example XII was charged to 9 volts for a period of 43 minutes. The device was then connected to a d.c. motor which ran for a total of 8 minutes. During the discharge of the device, the motor initially spun rapidly for two to three minutes with no apparent loss of speed and thereafter noticeably slowed.

Approximately 58 minutes later, the device was reconnected to the 9 volt power source and was recharged for a period of 7 minutes. The storage device was then connected to the d.c. motor and allowed to discharge. The d.c. motor, which was connected to a paper pin wheel and ran for approximately 7 minutes and 55 seconds. The storage device was once again recharged to 9 volts for a period of 9 minutes and reconnected to the motor. The storage device powered the motor for 13 minutes. This procedure was repeated for a charge period of 11 minutes. The storage device powered the motor for approximately 5 minutes.

Figure 22:
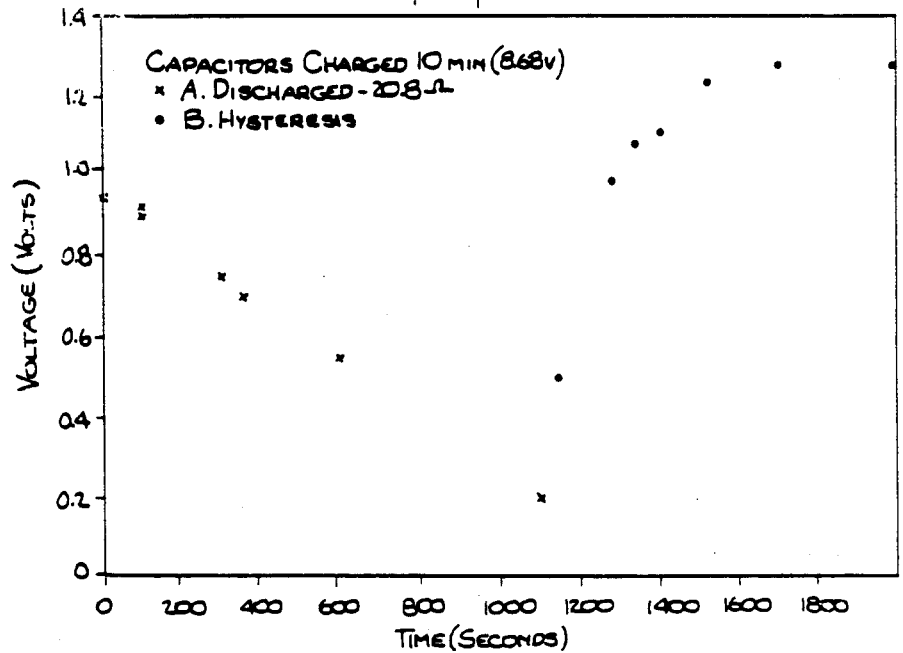
FIG. 22 illustrates the variation of the voltage of the storage of FIG. 13 as set forth in Example XII.

The storage device described in Example XII was charged for a period of 10 minutes to 8.68 volts. The device was then discharged through a motor which had a resistance of 20.8 ohms. Subsequent to the discharge, the device was left in a quiescent state whereupon it displayed a hysteresis effect of recharging from about 0.2V to about 1.2V in a few minutes. This hysteresis effect indicates that the storage device of the present invention exhibits a recharging capability such as that possessed by batteries. FIG. 22 illustrates the discharge and hysteresis effect as a function of time.

NONISOTROPIC SOLUTIONS

Figure 24:
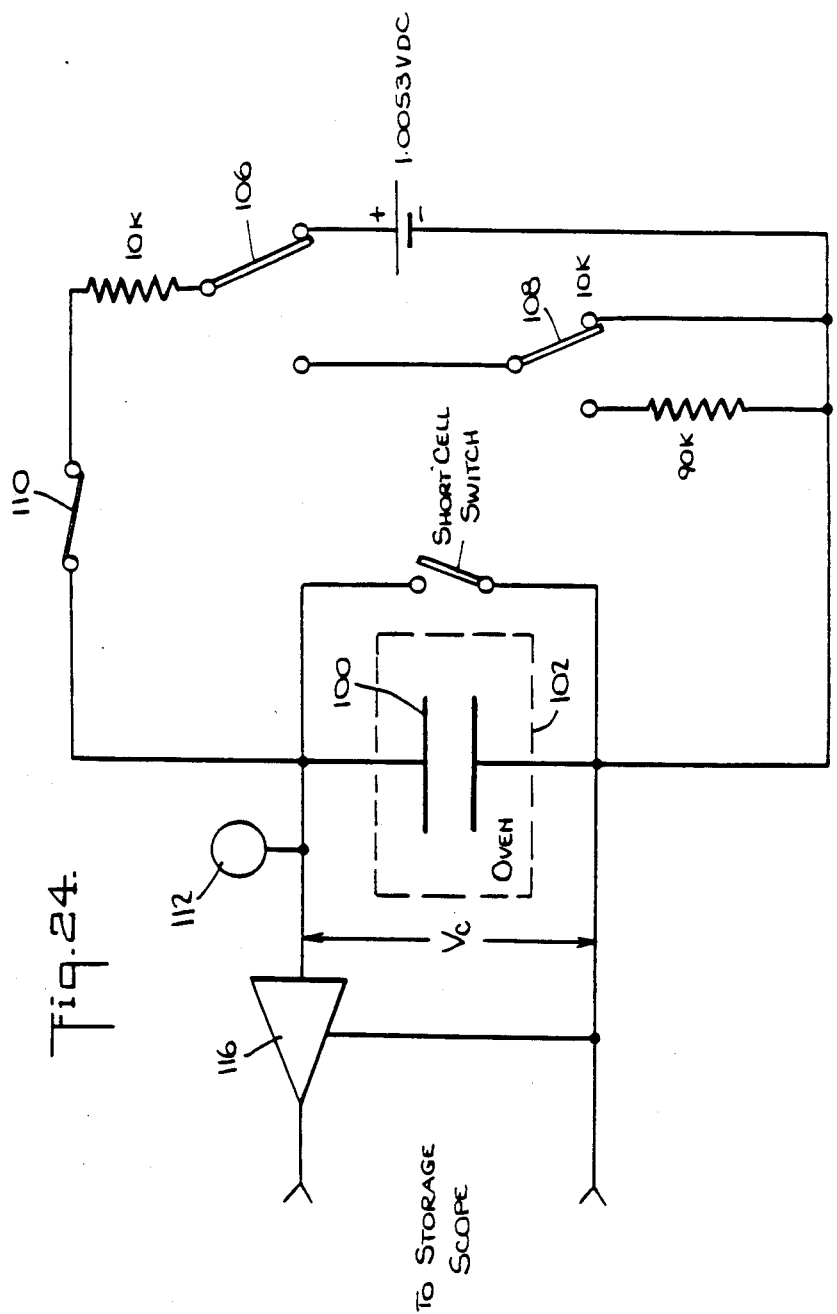
FIG. 24 shows an electrical circuit used for determining the electrical characteristics of various nonisotropic solutions as set forth in Examples XIV–XXVIII.

In order to determine whether nonisotropic solutions could be used as dielectrics in capacitors or as electrolytes in supercapacitors test devices were built and their DC parameters including capacitance, leakage current, and self-discharge rates were measured. The DC capacitance measurements have been performed at 1 volt using the circuit shown in FIG. 24. The circuit includes a supercapacitor 100 disposed in an oven 102 for temperature control. The supercapacitor is first charged from a battery 104 through a SPPT switch. The device is discharged by throwing switch 106 into the discharge position. The load on the supercapacitor is selected by a load select switch 108. To measure the self-discharge rate of the super capacitor, a third switch 110 is opened. The voltage across the super capacitor is measured at test point 112. This voltage may also be monitored by other instruments such as a storage scope through a preamp 116.

The test supercapacitor 100 was of the parallel plate type, using 3.25 cm diameter circular stainless steel disks as electrodes. Sample spacing was controlled by using a thin spacer of cellulose acetate between the electrodes. Samples were prepared by depositing a thin coating of the solid soap to the electrodes, placing the electrodes into a hydraulic press and using a heat gun to soften the soap. Pressure was then applied to the electrodes. Heat shrink tubing was applied to the electrode edges to prevent moisture evaporation.

The sample was then transferred to oven 102 for DC capacitance measurements. High temperature measurements were completed first. The sample was allowed to equilibrate at the lamellar liquid crystal phase for approximately two hours before measurements were made. The following experimental procedure was used.

A one volt potential was applied to the sample for a one hour period. Leakage current was measured at 1, 2, 3, 5, 10, 30, and 60 minutes. After this one hour charging cycle, the sample was discharged through a 10K ohm resistor. The capacitance was calculated from the time required for the potential across the capacitor to reach 36.8% of the charging potential, i.e., by measuring the time constant of the circuit.

The sample was then recharged until the leakage current was equal to the 60 minute leakage current obtained during the first charging cycle. The capacitor was then discharged through a 100K ohm resistor. A third charge cycle was begun, terminating when the leakage current was equal to the 60 minute leakage current obtained during the first charging cycle, and the self-discharge was measured.

The sample was then slowly cooled to room temperature under a 10K ohm resistive load and the procedure was repeated.

The samples used in this study included commercial Colgate Palmolive ® neat soap consisting of a blend of 75/25% tallow and coconut oil, and high purity anhydrous soaps. The anhydrous soaps were mixed with 30 weight percent deuterated water. For each soap the temperature was raised to the isotropic solution temperature. The samples were then brought to the lamellar liquid crystal neat soap region of the phase diagram and quenched to room temperature.

The minimum lamellar phase temperature for each soap tested is provided below:

| Soap | Temperature (°C.) |
|---|---|
| Sodium Stearate | 85–87 |
| Potassium Stearate | 60 |
| Potassium Laurate | Ambient |
| Sodium Laurate | 69–72 |
| Sodium Palmitate | 80–85° C. |
| Sodium Myristate | 77–80° C. |

The DC capacitance measurements obtained for the tested nonisotropic solutions is listed in the following examples. In all these examples the current is given in microamps.

| EXAMPLE XIV | |
|---|---|
| Soap: Potassium Stearate | Temperature: 65° C. |
| Applied Voltage: 1 Volt | Sample Thickness: 0.01 cm |
| Surface Area of Electrodes: 4.453 cm$^2$ | |
| Leakage Current | Time (min) |
| 36 | 1 |
| 31 | 2 |
| 28 | 3 |
| 24 | 5 |
| 18 | 10 |
| 8.6 | 30 |
| 4.7 | 60 |
| DC capacitance - 10 K ohm discharge | 1,450 microFarads |
| DC capacitance - 100 K ohm discharge | 3,190 microFarads |

EXAMPLE XV

| EXAMPLE XV | |
|---|---|
| Soap: Potassium Stearate | Temperature: 25° C. |
| Applied Voltage: 1 Volt | Sample Thickness: .01 cm |
| Surface Area of Electrodes: 4.453 cm$^2$ | |
| Leakage Current | Time (min) |
| 14.6 | 1 |
| 10 | 2 |
| 7.9 | 3 |
| 5.8 | 5 |
| 3.6 | 10 |

EXAMPLE XV -continued

| | |
|---|---|
| 1.6 | 30 |
| 1.0 | 60 |
| DC capacitance - 10 K ohm discharge | 563 microFarads |
| DC capacitance - 100 K ohm discharge | 762 microFarads |

Self-Discharge:

| Voltage | Time (min) |
|---|---|
| .9953 | 0 |
| .9437 | 1 |
| .9127 | 2 |
| .8878 | 3 |
| .8669 | 4 |
| .8489 | 5 |
| .8330 | 6 |
| .8188 | 7 |
| .8059 | 8 |
| .7941 | 9 |
| .7834 | 10 |
| .7066 | 20 |
| .6584 | 30 |

EXAMPLE XVI

| | |
|---|---|
| Soap: Colgate Palmolive ® Neat Soap | Temperature: 80° C. |
| Applied Voltage: 1 Volt | Sample Thickness: 0.01 cm |
| Surface Area of Electrodes: 5.06 cm$^2$ | |

| Leakage Current | Time (min) |
|---|---|
| 24.2 | 1 |
| 18.8 | 2 |
| 16.1 | 3 |
| 13.8 | 5 |
| 11.8 | 10 |
| 10.2 | 30 |
| 9.2 | 60 |
| DC capacitance - 10 K ohm discharge | 3050 microFarads |
| DC capacitance - 100 K ohm discharge | 2004 microFarads |

Self-Discharge:

| Voltage | Time (min) |
|---|---|
| .908 | 0 |
| .699 | 1 |
| .612 | 2 |
| .546 | 3 |
| .492 | 4 |
| .445 | 5 |
| .402 | 6 |
| .364 | 7 |
| .330 | 8 |
| .301 | 9 |
| .276 | 10 |
| .129 | 20 |
| .071 | 30 |

EXAMPLE XVII

| | |
|---|---|
| Soap: Colgate Palmolive ® Neat Soap | Temperature: 25° C. |
| Applied Voltage: 1 Volt | Sample Thickness: 0.01 cm |
| Surface Area of Electrodes: 5.06 cm$^2$ | |

| Leakage Current | Time (min) |
|---|---|
| 8.7 | 1 |
|  | 2 |
| 4.6 | 3 |
| 3.7 | 5 |
| 2.8 | 10 |
| 1.9 | 30 |
| 1.7 | 60 |
| DC cpacitance - 10 K ohm discharge | 620 microFarads |
| DC capcitance - 100 K ohm discharge | 830 microFarads |

EXAMPLE XVII -continued

Self-Discharge:

| Voltage | Time (min) |
|---|---|
| .988 | 0 |
| .845 | 1 |
| .786 | 2 |
| .745 | 5 |

EXAMPLE XVIII

| | |
|---|---|
| Soap: Potassium Laurate | Temperature: 25° C. |
| Applied Voltage: 1 Volt | Sample Thickness: 0.005 cm |
| Surface Area of Electrodes: 5.07 cm$^2$ | |

| Leakage Current | Time (min) |
|---|---|
| 9.8 | 1 |
| 6.3 | 2 |
| 4.8 | 3 |
| 3.4 | 5 |
| 2.1 | 10 |
| 7.0 | 30 |
| 0.6 | 60 |
| DC capacitance - 10 K ohm discharge | 530 microFarads |
| DC capacitance - 100 K ohm discharge | 701 microFarads |

Self-Discharge:

| Voltage | Time (min) |
|---|---|
| .999 | 0 |
| .962 | 1 |
| .938 | 2 |
| .919 | 3 |
| .902 | 4 |
| .888 | 5 |
| .875 | 6 |
| .863 | 7 |
| .852 | 8 |
| .842 | 9 |
| .833 | 10 |
| .764 | 20 |
| .717 | 30 |
| .681 | 40 |

EXAMPLE XIX

| | |
|---|---|
| Soap: Potassium Laurate | Temperature: 40° C. |
| Applied Voltage: 1 Volt | Sample Thickness: 0.005 cm |
| Surface Area of Electrodes: 5.07cm$^2$ | |

| Leakage Current | Time (min) |
|---|---|
| 7.9 | 1 |
| 4.5 | 2 |
| 3.3 | 3 |
| 2.4 | 5 |
| 1.5 | 10 |
| 0.8 | 30 |
| 0.6 | 60 |
| DC capacitance - 10 K ohm discharge | 554 microFarads |
| DC capacitance - 100 K ohm discharge | 870 microFarads |

Self-Discharge:

| Voltage | Time (min) |
|---|---|
| .999 | 0 |
| .958 | 1 |
| .931 | 2 |
| .910 | 3 |
| .892 | 4 |
| .877 | 5 |
| .863 | 6 |
| .851 | 7 |
| .840 | 8 |
| .829 | 9 |
| .820 | 10 |

-continued

EXAMPLE XIX

| | |
|---|---|
| .753 | 20 |
| .711 | 30 |
| .680 | 40 |
| .656 | 50 |

EXAMPLE XX

EXAMPLE XX

Soap: Sodium Laurate  Temperature: 25° C.
Applied Voltage: 1 Volt  Sample Thickness: 0.0125 cm
Surface Area of Electrodes: 4.453 cm$^2$

| Leakage Current | Time (min) |
|---|---|
| 11.2 | 1 |
| 6.9 | 2 |
| 5.1 | 3 |
| 3.4 | 5 |
| 2.0 | 10 |
| 0.8 | 30 |
| 0.5 | 60 |
| DC capacitance - 10 K ohm discharge | 566 microFarads |
| DC capacitance - 100 K ohm discharge | 846 microFarads |

Self-Discharge:

| Voltage | Time (min) |
|---|---|
| .9712 | 1 |
| .9530 | 2 |
| .9380 | 3 |
| .9250 | 4 |
| .9134 | 5 |
| .9031 | 6 |
| .8936 | 7 |
| .8849 | 8 |
| .8768 | 9 |
| .8693 | 10 |
| .8132 | 20 |
| .7758 | 30 |
| .7475 | 40 |
| .7248 | 50 |

EXAMPLE XXI

EXAMPLE XXI

Soap: Sodium Laurate  Temperature: 81° C.
Applied Voltage: 1 Volt  Sample Thickness: 0.0125 cm
Surface Area of Electrodes: 4.453 cm$^2$

| Leakage Current | Time (min) |
|---|---|
| 33.1 | 1 |
| 26.0 | 2 |
| 22.0 | 3 |
| 18.0 | 5 |
| 12.4 | 10 |
| 6.6 | 30 |
| 4.4 | 60 |
| DC capacitance - 10 K ohm discharge | 1,762 microFarads |
| DC capacitance - 100 K ohm discharge | 2,520 microFarads |

Self-Discharge:

| Voltage | Time (min) |
|---|---|
| .9620 | 0 |
| .8587 | 1 |
| .7636 | 2 |
| .7317 | 3 |
| .7056 | 4 |
| .6830 | 5 |
| .6632 | 6 |
| .6456 | 7 |
| .6298 | 8 |
| .6154 | 9 |
| .5165 | 10 |

EXAMPLE XXII

EXAMPLE XXII

Soap: Sodium Stearate  Temperature: 25° C.
Applied Voltage: 1 Volt  Sample Thickness: 0.01 cm
Surface Area of Electrodes: 4.453 cm$^2$

| Leakage Current | Time (min) |
|---|---|
| 3.5 | 1 |
| 2.1 | 2 |
| 1.6 | 3 |
| 1.1 | 5 |
| 0.7 | 10 |
| 0.4 | 30 |
| 0.3 | 60 |
| DC capacitance - 10 K ohm discharge | 222 microFarads |
| DC capacitance - 100 K ohm discharge | 402 microFarads |

Self-Discharge:

| Voltage | Time (min) |
|---|---|
| .9754 | 2 |
| .9593 | 3 |
| .9351 | 4 |
| .9253 | 5 |
| .9165 | 6 |
| .9086 | 7 |
| .9012 | 8 |
| .8944 | 9 |
| .8881 | 10 |
| .8401 | 20 |
| .8073 | 30 |

EXAMPLE XXIII

EXAMPLE XXIII

Soap: Sodium Stearate  Temperature: 95° C.
Applied Voltage: 1 Volt  Sample Thickness: 0.01 cm
Surface Area of Electrodes: 4.453 cm$^2$

| Leakage Current | Time (min) |
|---|---|
| 25.8 | 1 |
| 18.8 | 2 |
| 14.8 | 3 |
| 10.2 | 5 |
| 5.9 | 10 |
| 3.4 | 30 |
| 2.8 | 60 |
| DC capacitance - 10 K ohm discharge | 2,088 microFarads |
| DC capacitance - 100 K ohm discharge | 3,014 microFarads |

Self-Discharge:

| Voltage | Time (min) |
|---|---|
| .9782 | 0 |
| .9079 | 1 |
| .8622 | 2 |
| .8248 | 3 |
| .7923 | 4 |
| .7637 | 5 |
| .7372 | 6 |
| .7130 | 7 |
| .6906 | 8 |
| .6698 | 9 |
| .6504 | 10 |
| .5169 | 20 |
| .4305 | 30 |

EXAMPLE XXIV

EXAMPLE XXIV

Soap: Sodium Myristate  Temperature: 25° C.
Applied Voltage: 1 Volt  Sample Thickness: 0.0125 cm
Surface Area of Electrodes: 5.067 cm$^2$

| Leakage Current | Time (min) |
|---|---|
| 5.3 | 1 |

-continued
EXAMPLE XXIV

| | |
|---|---|
| 3.2 | 2 |
| 2.4 | 3 |
| 1.7 | 5 |
| 1.0 | 10 |
| 0.4 | 30 |
| 0.2 | 60 |
| DC capacitance - 10 K ohm discharge | 298 microFarads |
| DC capacitance - 100 K ohm discharge | 475 microFarads |
| Self-Discharge: | |
| Voltage | Time (min) |
| .980 | 1 |
| .966 | 2 |
| .955 | 3 |
| .945 | 4 |
| .036 | 5 |
| .929 | 6 |
| .921 | 7 |
| .915 | 8 |
| .909 | 9 |
| .903 | 10 |
| .852 | 20 |

EXAMPLE XXV

EXAMPLE XXV

| Soap: Sodium Myristate | Temperature: 90° C. |
|---|---|
| Applied Voltage: 1 Volt | Sample Thickness: 0.0125 cm |
| Surface Area of Electrodes: 5.067 cm$^2$ | |

| Leakage Current | Time (min) |
|---|---|
| 29.3 | 1 |
| 24.0 | 2 |
| 21.0 | 3 |
| 16.0 | 5 |
| 11.8 | 10 |
| 4.3 | 30 |
| 3.0 | 60 |
| DC capacitance - 10 K ohm discharge | 1,092 microFarads |
| DC capacitance - 100 K ohm discharge | 1,491 microFarads |
| Self-Discharge: | |
| Voltage | Time (min) |
| .976 | 0 |
| .881 | 1 |
| .823 | 2 |
| .777 | 3 |
| .739 | 4 |
| .707 | 5 |
| .679 | 6 |
| .655 | 7 |
| .634 | 8 |
| .616 | 9 |
| .600 | 10 |
| .497 | 20 |
| .440 | 30 |
| .401 | 40 |

EXAMPLE XXVI

EXAMPLE XXVI

| Soap: Sodium Palmitate | Temperature: 25° C. |
|---|---|
| Applied Voltage: 1 volt | Sample Thickness: .0075 cm |
| Surface Area of Electrodes: 5.06 cm$^2$ | |

| Leakage Current | Time (min) |
|---|---|
| 6.6 | 1 |
| 4.4 | 2 |
| 3.4 | 3 |
| 2.6 | 5 |
| 1.6 | 10 |
| 1.0 | 30 |
| .8 | 60 |
| DC capacitance - 10 K ohm discharge | 354 microFarads |

-continued
EXAMPLE XXVI

| DC capacitance - 100 K ohm discharge | 809 microFarads |
|---|---|
| Self-Discharge: | |
| Voltage | Time (min) |
| .9974 | 0 |
| .9213 | 1 |
| .8846 | 2 |
| .8574 | 3 |
| .8354 | 4 |
| .8168 | 5 |
| .8007 | 6 |
| .7864 | 7 |
| .7735 | 8 |
| .7617 | 9 |
| .7509 | 10 |
| .2388 | 16 hours |

EXAMPLE XXVII

EXAMPLE XXVII

| Soap: Sodium Palmitate | Temperature: 88° C. |
|---|---|
| Applied Voltage: 1 Volt | Sample Thickness: 0.0075 cm |
| Surface Area of Electrodes: 5.067 cm$^2$ | |

| Leakage Current (amp) | Time (min) |
|---|---|
| 21.7 | 1 |
| 16.0 | 2 |
| 13.2 | 3 |
| 10.2 | 5 |
| 7.2 | 10 |
| 3.9 | 30 |
| 2.5 | 60 |
| DC capacitance - 10 K ohm discharge | 3116 microFarads |
| DC capacitance - 100 K ohm discharge | 4892 microFarads |
| Self-Discharge: | |
| Voltage | Time (min) |
| .917 | 1 |
| .883 | 2 |
| .856 | 3 |
| .833 | 4 |
| .813 | 5 |
| .795 | 6 |
| .779 | 7 |
| .765 | 8 |
| .751 | 9 |
| .739 | 10 |
| .643 | 20 |
| .578 | 30 |

Additional experiments were also performed with the Colgate Palmolive ® neat soap as a function of temperature and applied voltage. Using electrodes of 3.3 cm in diameter and a sample thickness of 0.0125 cm, the following leakage currents were obtained after 30 minutes.

| Temperature | Voltage | Leakage Current Microamps |
|---|---|---|
| 25 | 0.5 | .2-.6 |
| 25 | 1.0 | 3.0-5.6 |
| 40 | 0.5 | 1.3 |
| 50 | 0.5 | 2.2 |
| 60 | 0.5 | 3.2 |
| 60 | 1.0 | 10.2 |

Figure 25:
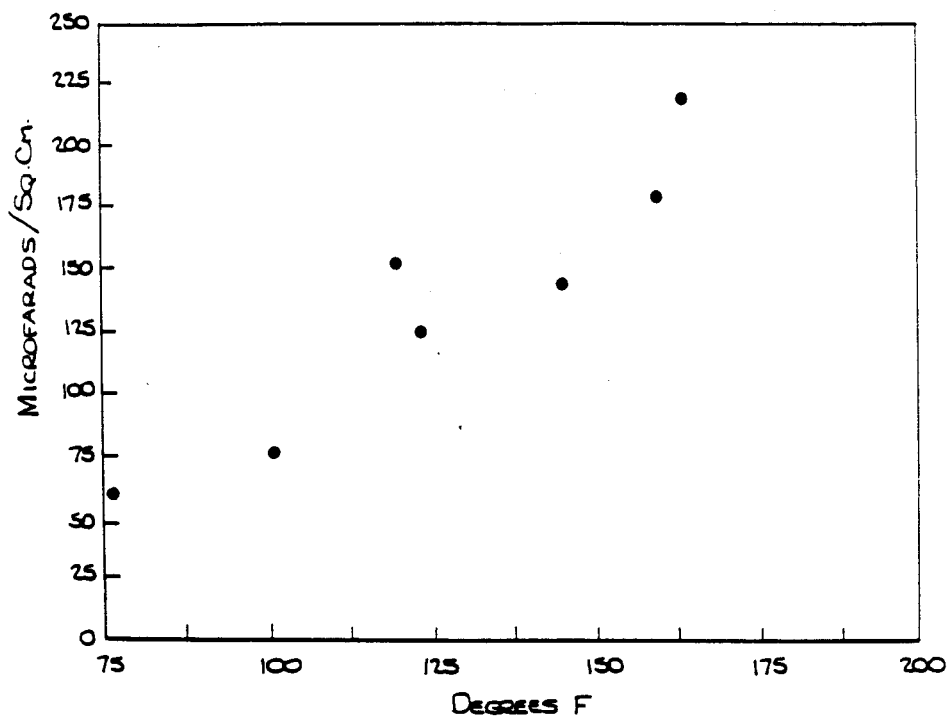
FIG. 25 illustrates the temperature dependence of capacitance of a super capacitor constructed in accordance with this invention.

The capacitance was determined by the discharge RC time constant using a 1K ohm resistor. The capacitance increases with increasing temperature. Data is summarized in FIG. 25. In the case of the Colgate Palmolive ® neat soap containing 0.3% NaCl, the capacitance did not appear to be a function of sample thickness and varied only with surface area of the electrodes. This behavior matches the behavior of supercapacitors. The data shows a significant improvement of the supercapacitors described in the above mentioned literature when compared in parallel plate configurations.

Figure 26:
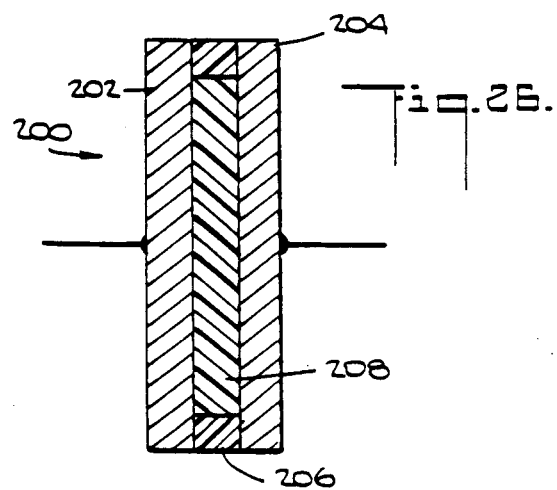
FIG. 26 illustrates a battery constructed in accordance with this invention.

Surprisingly, using two dissimilar metal electrodes, for example, aluminum and stainless steel, separated by an electrolyte containing Colgate Palmolive ® neat soap and 0.3% NaCl functioned as an electrochemical primary battery. Such a battery is shown in FIG. 26. The battery cell 200 includes two plates 202, 204 separated by a fiberglass mesh screen 206. The mesh had a thickness of 0.025 cm, and is impregnated with an electrolyte 208 consisting of the neat soap. One electrode was made of #316 stainless steel foil, while the other electrode was made of aluminum foil. Three such battery cells having 6.25 cm² electrodes were connected in parallel. The three battery cells in parallel generated over 1 volt, without any external charging. When discharged through a 10K ohm resistor for a period of 10 minutes, the following current flow was obtained from the three battery cells:

| Current (microamps) | time (seconds) |
|---|---|
| 120 | 1 |
| 83 | 10 |
| 67 | 100 |
| 57 | 425 |
| 55 | 600 |

When disconnected from the resistive load, the battery cells rejuvenated themselves to a potential 1.1 volts within three minutes.

A second battery cell was made using 9.6 cm² electrodes of #316 stainless steel foil and aluminum foil, with an electrolyte of Colgate Palmolive ® neat soap with 0.3% NaCl impregnating a fiberglass spacer. The potential across the battery cell was 1.3 volts. The current versus time discharge characteristics under a load of 10K ohm was as follows:

| Current (microamps) | Time (seconds) |
|---|---|
| Starting potential 1.335 volts | 0 |
| 128.5 | 1 |
| 110.5 | 10 |
| 94 | 100 |
| 83.5 | 1000 |
| 75 | 3000 |
| 72 | 4000 |
| 68.5 | 8000 |

Next, two battery cells, were constructed, each having 9.6 cm² plates connected in parallel. The voltage output of the batteries was 1.2 volts after approximately 20 minutes. The batteries were connected to a 100 ohm resistor to measure current during discharge. The following data was obtained.

| Current (microamps) | Time (seconds) |
|---|---|
| Starting potential 1.2 volts | 0 |
| 2800 | 10 |
| 500 | 100 |
| 450 | 800 |

At this point the battery cells were disconnected from the resistor and the voltage measured across batteries as a functions of time was as follows:

| Voltage | Time (seconds) |
|---|---|
| 0.040 | 0 |
| 0.240 | 1 |
| 1.060 | 1000 |
| 1.180 | 3140 |

The cells were left undisturbed for approximately 15 hours and again discharged through a 100 ohm resistor. The following current versus time characteristic was obtained:

| Current (microamps) | Time (seconds) |
|---|---|
| Starting potential of 1.13 volts | 0 |
| 6500 | 1 |
| 4100 | 10 |
| 1050 | 100 |
| 250 | 400 |

The same two battery cells connected in parallel were first allowed to rejuvenate and then were discharged again through 100 ohms. The results are shown below:

| Current (microamps) | Time (seconds) |
|---|---|
| Starting potential of 1.08 volts | 0 |
| 1200 | 100 |
| 750 | 200 |
| 500 | 500 |
| 400 | 700 |
| 350 | 1000 |
| 400 | 3600 |
| 400 | 10800 |

For a three hour period, the two cells in parallel under a resistive load of 100 ohms delivered a constant 0.400 milliamp current.

EXAMPLE XXVIII

The capacitance of various alternative amphiphatic compounds, as shown in the Table below, were measured substantially in accordance with the procedures described above between Examples XIII and XIV.

The results of those measurements are summarized in the Table below. Thirty (30 to sixty (60) minute charging cycles between stainless steel parallel plate electrodes,, 10.1K ohm discharge resistance and ambient temperatures (25° C.±1° C.) were employed for all measurements. The capacitance of common dielectrics, such as air and mineral oil, were measured for comparative purposes.

TABLE

| | Capacitance (microfarads) | | | | | | | | |
|---|---|---|---|---|---|---|---|---|---|
| % wt. Deionized | 0 | 10 | 20 | 30 | 40 | 50 | 60 | 70 | 80 |
| Water | | | | | · | | | | |
| Air | 0.4–0.5 | | | | | | | | |

TABLE-continued

| % wt. Deionized | Capacitance (microfarads) | | | | | | | | |
|---|---|---|---|---|---|---|---|---|---|
| | 0 | 10 | 20 | 30 | 40 | 50 | 60 | 70 | 80 |
| Mineral Oil | 0.4 | | | | | | | | |
| $PEO_{C12\ to\ 13}$ EO = 5 | 700* | 871 | 4500 | 990 | 1500 | | | | |
| $PEO_{C12\ to\ 15}$ EO = 3 | 272* | | 430 | | 760 | | | | |
| $PEO_{C12\ to\ 14}$ EO = 1 | 87 | | | | | | | | |
| $PEO_{C14\ to\ 16}$ EO = 3 | | | | 497 | | 717 | | 1002 | |
| $PEO_{C14\ to\ 15}$ EO = 13 | 81* | | | | | | | | |
| cesium myristate 75/15 neat soap | | | | 1000 | | 1450 | | | |
| ammonium laurate | 1400* | | | | | | | | |
| Triethanol amine stearate | | 1020 | | | | | | | |
| laurate | | 1081 | | | | | | | |
| alkyl polyglucoside NPS-225 | | 727 | | | | | | | |

All of the tested samples exhibiting high capacitance had distinctly liquid crystalline microstructures under test conditions and exhibited the highest capacitance values in the smectic lamellar phase. Although the PEO without water is isotropic when current is applied the molecules in the vicinity of the electrodes organize into a lamellar liquid crystal microstructure. The data demonstrates that various species of amphiphatic compounds exhibit high capacitance even when diluted with up to 80% wt.

While the present invention has been particularly described in terms of specific embodiments thereof, it will be understood in view of the present disclosure, that numerous variations upon the invention are now enabled to those skilled in the art, which variations yet reside within the scope of the present invention. Accordingly, the invention is to be broadly construed, and limited only by the scope and spirit of the claims now appended hereto.

What is claimed is:

1. An electrical device comprising an electrical transmission means connected to a nonisotropic compound selected from the group consisting of nonionic, cationic, anionic and amphoteric surfactants wherein the surfactant is selected from the group consisting of polyethylene oxide polymers and copolymers.

2. The device of claim 1 wherein the polyethylene oxide polymer includes $C_5$ to $C_{20}$ alkyl group and at least two ethylene oxide groups.

3. The device of claims 1 or 2 wherein said nonisotropic compound further includes a liquid.

4. The device of claim 6 wherein said nonisotropic compound is selected from the group consisting of solutions having a liquid crystal microstructure and polymorphic solid micellar solutions.

5. The device of claim 4 wherein said liquid further includes an electrolyte.

6. The device of claim 1 wherein said nonisotropic compound has a lamellar liquid crystal microstructure.

7. The device of claim 6 wherein said nonisotropic compound further includes a polar liquid.

8. The device of claim 7 wherein the polar liquid is water.

9. The device of claim 8 wherein said polar liquid further includes an electrolyte selected from the group consisting of alkali metal salts, alkaline earth metal salts, ammonium salts, and alkanolammonium salts.

10. The device of claim 8 wherein said polar liquid further includes an electrolyte selected from the group consisting of sodium, lithium, potassium, rubidium and cesium salts.

11. The device of claim 7 wherein the nonisotropic compound includes about 6 to about 80% wt water.

12. The device of claim 1 wherein said nonisotropic compound has a microstructure selected from the group consisting of neat, subneat, superwaxy, waxy, subwaxy and middle soaps.

13. The device of claim 1 wherein the device is a capacitor.

14. An electrical device comprising an electrical transmission means connected to a nonisotropic compound selected from the group consisting of cesium meristate, ammonium laurate, triethanolamine stearate, and triethanolamine laurate.

* * * * *